(12) United States Patent
Baldasaro et al.

(10) Patent No.: US 10,929,193 B2
(45) Date of Patent: *Feb. 23, 2021

(54) METHODS AND SYSTEMS FOR AUTOMATED MONITORING AND CONTROL OF ADHERENCE PARAMETERS

(71) Applicant: SAS Institute Inc., Cary, NC (US)

(72) Inventors: Ruth Ellen Baldasaro, Cary, NC (US); Jennifer Lee Hargrove, Raleigh, NC (US); Edward Lew Rowe, Cary, NC (US); Emily Louise Chapman-McQuiston, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,506

(22) Filed: Aug. 5, 2019

(65) Prior Publication Data

US 2019/0354410 A1 Nov. 21, 2019

Related U.S. Application Data

(63) Continuation of application No. 16/177,289, filed on Oct. 31, 2018, now Pat. No. 10,761,894.

(60) Provisional application No. 62/578,781, filed on Oct. 30, 2017, provisional application No. 62/686,758, filed on Jun. 19, 2018.

(51) Int. Cl.
*G06N 3/08* (2006.01)
*G06F 9/50* (2006.01)
*G06F 16/906* (2019.01)
*G06F 16/9038* (2019.01)
*G06F 16/9035* (2019.01)

(52) U.S. Cl.
CPC .......... *G06F 9/5072* (2013.01); *G06F 16/906* (2019.01); *G06N 3/08* (2013.01); *G06F 16/9035* (2019.01); *G06F 16/9038* (2019.01)

(58) Field of Classification Search
None
See application file for complete search history.

(56) References Cited

U.S. PATENT DOCUMENTS

2016/0210427 A1* 7/2016 Mynhier ................ G16H 10/60
2017/0255759 A1* 9/2017 McGrath ............. G06F 19/3456

* cited by examiner

*Primary Examiner* — Tuankhanh D Phan
(74) *Attorney, Agent, or Firm* — Kacvinsky Daisak Bluni PLLC

(57) ABSTRACT

Exemplary embodiments relate to systems for building a model of changes to data items when information the data items is limited or not directly observed. Exemplary embodiments allow properties of the data items to be inferred using a single data structure and creates a highly granular log of changes to the data item. Using this data structure, the time-varying nature of changes to the data item can be determined. The data structure may be used to identify characteristics associated with a regularly-performed action, to examine how adherence to the action affects a system, and to identify outcomes of non-adherence. Fungible data items may be mapped to a remediable condition or remedy class. This may be accomplished by automatically deriving conditions and remedial information from available information, matching the conditions to remedial classes or types via a customizable mapping, and then calculating adherence for the condition on the available information.

27 Claims, 18 Drawing Sheets

METHODS AND SYSTEMS FOR AUTOMATED MONITORING AND CONTROL OF ADHERENCE PARAMETERS

RELATED APPLICATIONS

This application is a continuation of, claims the benefit of and priority to previously filed U.S. patent application Ser. No. 16/177,289 filed Oct. 31, 2018, entitled "Methods and Systems for Automated Monitoring and Control of Adherence Parameters", which is hereby incorporated by reference in its entirety.

This application also claims the benefit of priority to U.S. Provisional Patent Application Ser. No. 62/578,781, filed on Oct. 30, 2017, and to U.S. Provisional Patent Application Ser. No. 62/686,753, filed on Jun. 19, 2018. The contents of the aforementioned applications are incorporated herein by reference.

BACKGROUND

Exemplary embodiments described herein are directed to the problem of data processing as it relates to monitoring the time-varying nature of a data item. In some situations, changes in a data item may not be directly recorded in a structure accessible to a system responsible for maintaining records relating to the data item. Conventionally, it is very difficult to determine the status of the data item from the information available, and systems are often left to estimate, at a high level of granularity, very general properties of the data item (e.g., the value of the data item may be estimated only very roughly, or only at widely-spaced intervals).

The problem of inferring values for the data items in the presence of limited information can be further complicated when some data items can serve as substitutes for others. For example, an event that changes the value of a data item in a particular class of data items may affect only one of the items in that class. It can be difficult to properly address the value of a given data item when the values of that data item are not directly observed and the data item is fungible with another data item.

BRIEF DESCRIPTION OF THE DRAWINGS

The present disclosure is described in conjunction with the appended figures.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive. Systems depicted in some of the figures may be provided in various configurations. In some embodiments, the systems may be configured as a distributed system where one or more components of the system are distributed across one or more networks in a cloud computing system.

Figure 1:
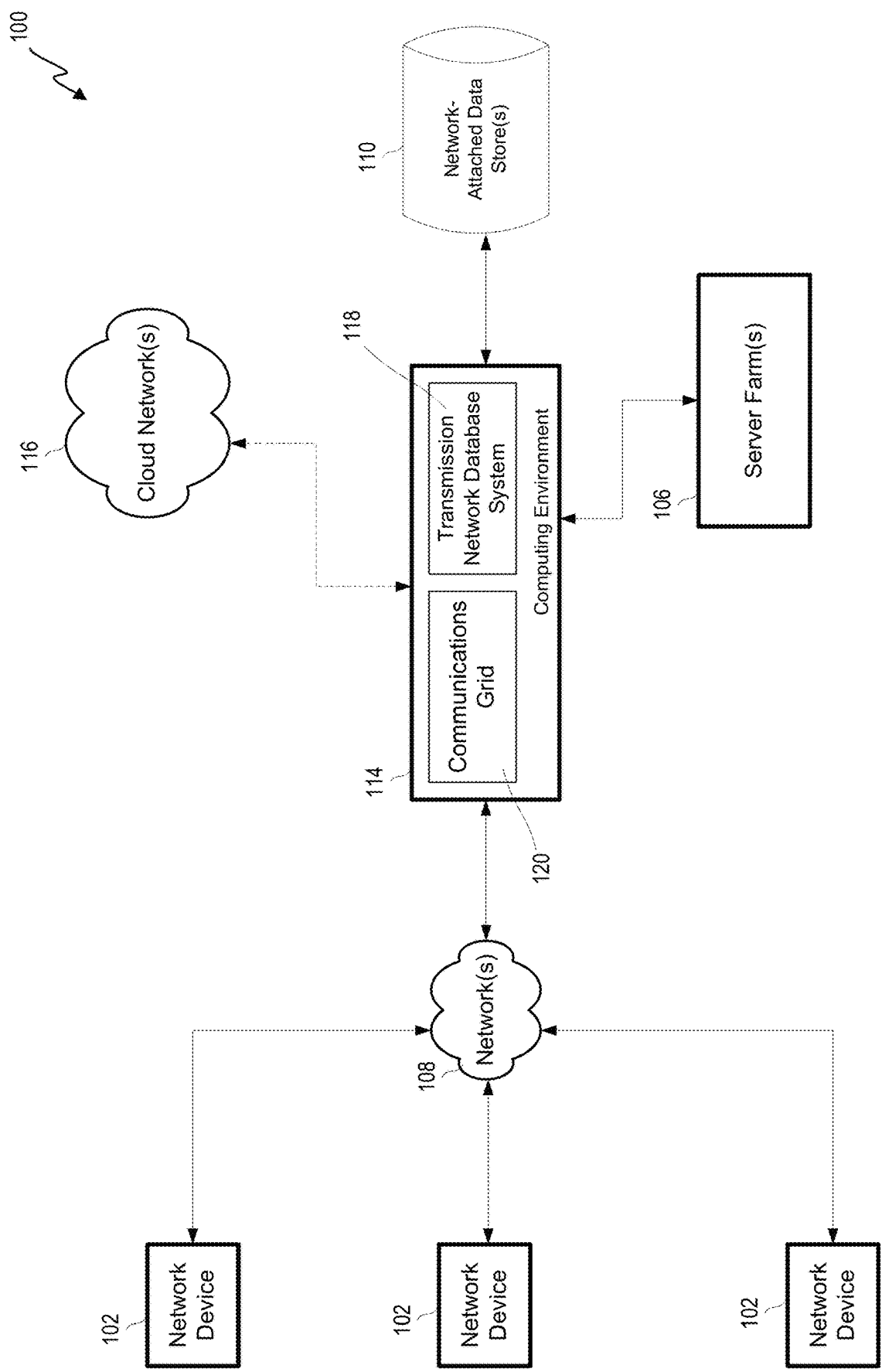
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
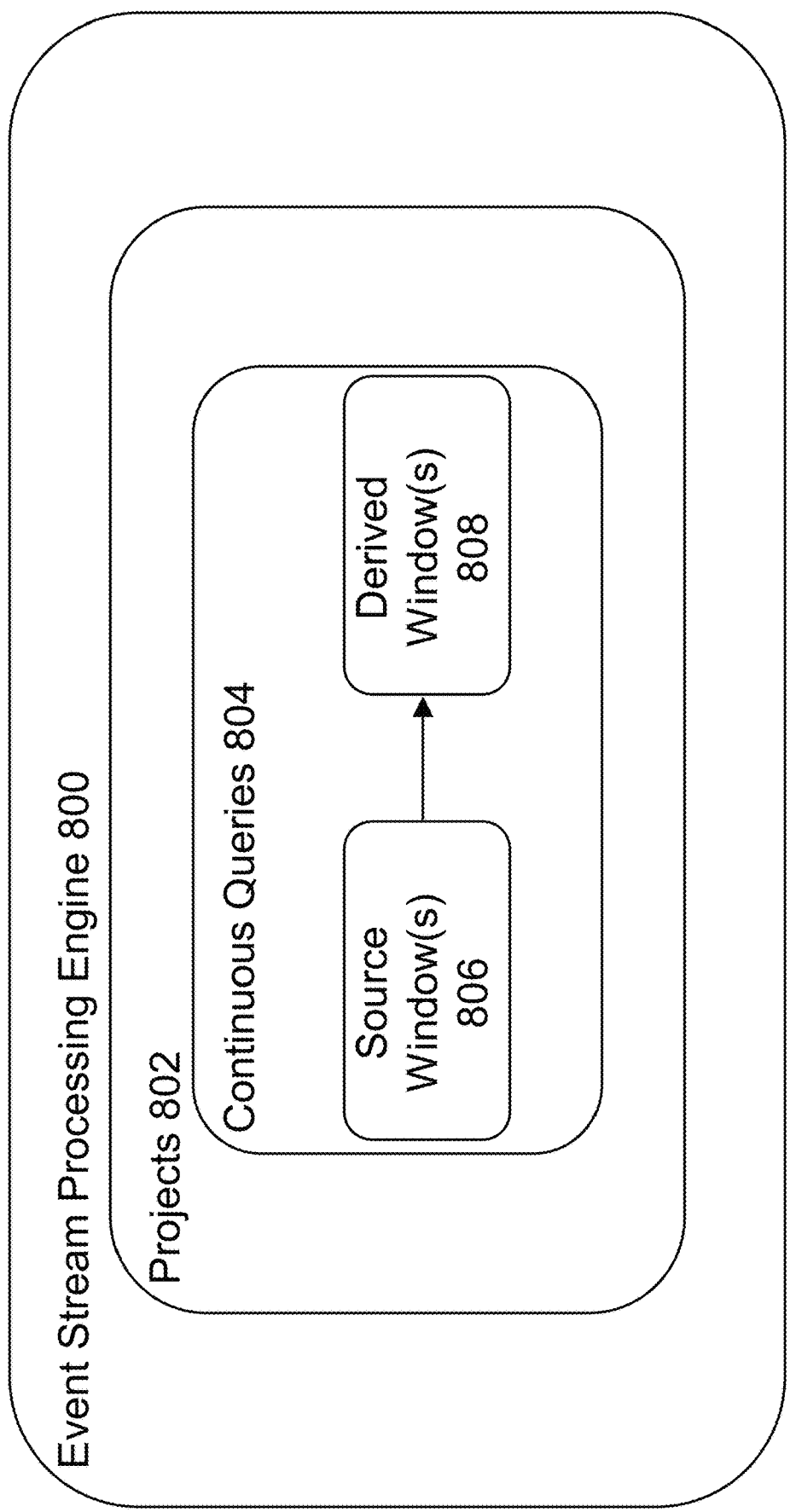
FIG. 8 illustrates a block diagram including components of an Event Stream Processing Engine (ESPE), according to embodiments of the present technology.
Figure 9:
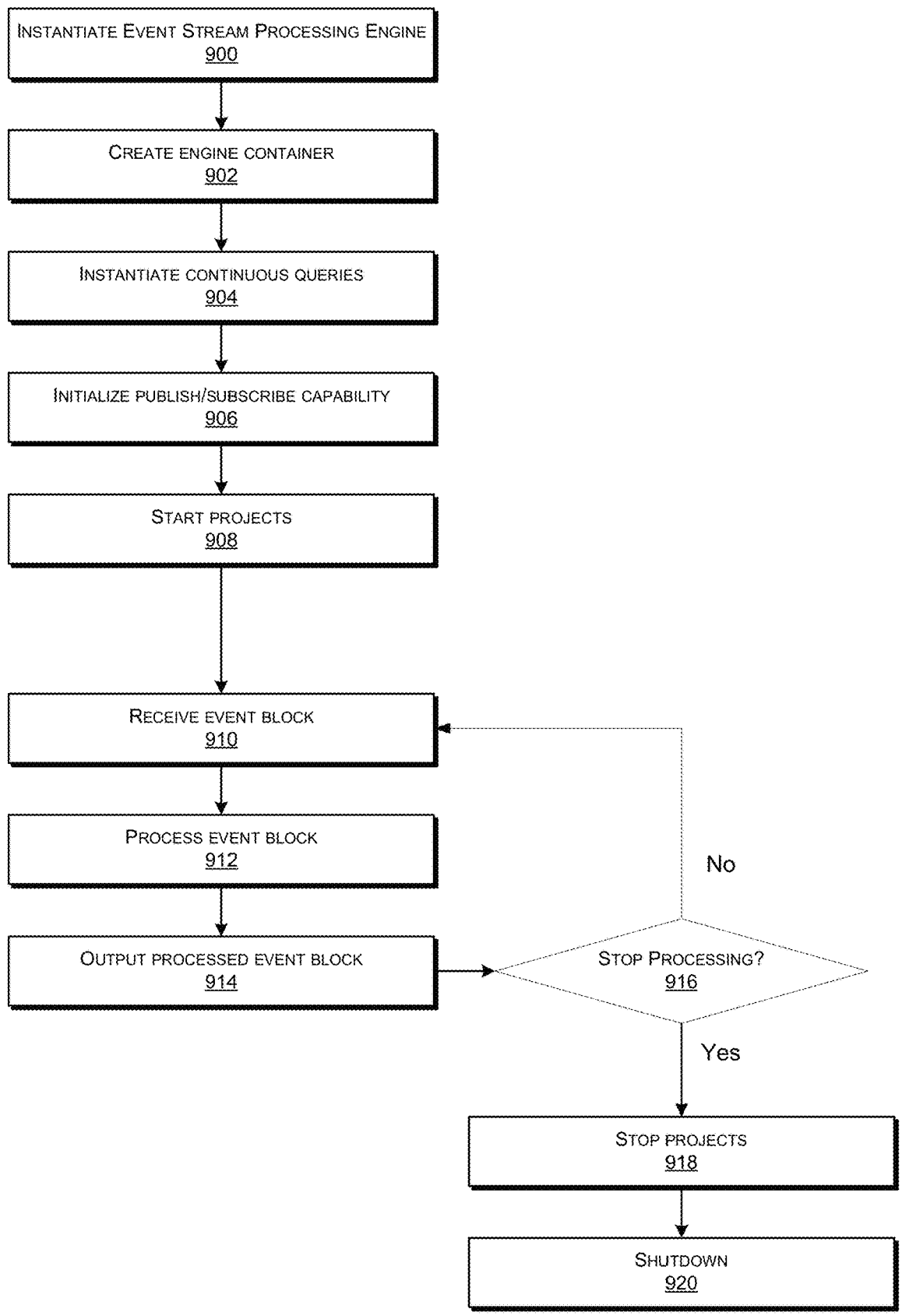
FIG. 9 illustrates a flow chart showing an example process including operations performed by an event stream processing engine, according to some embodiments of the present technology.
Figure 10:
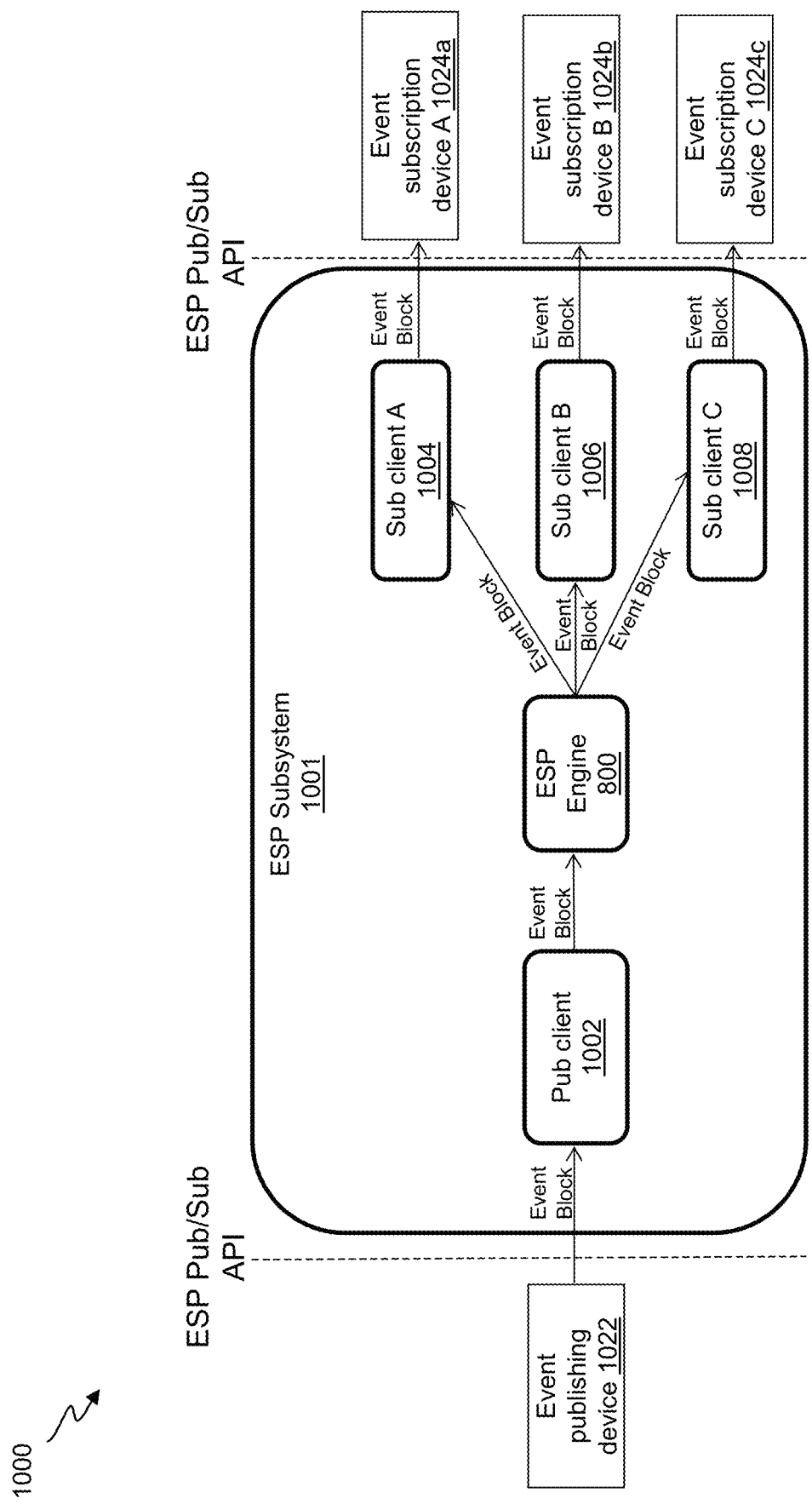
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
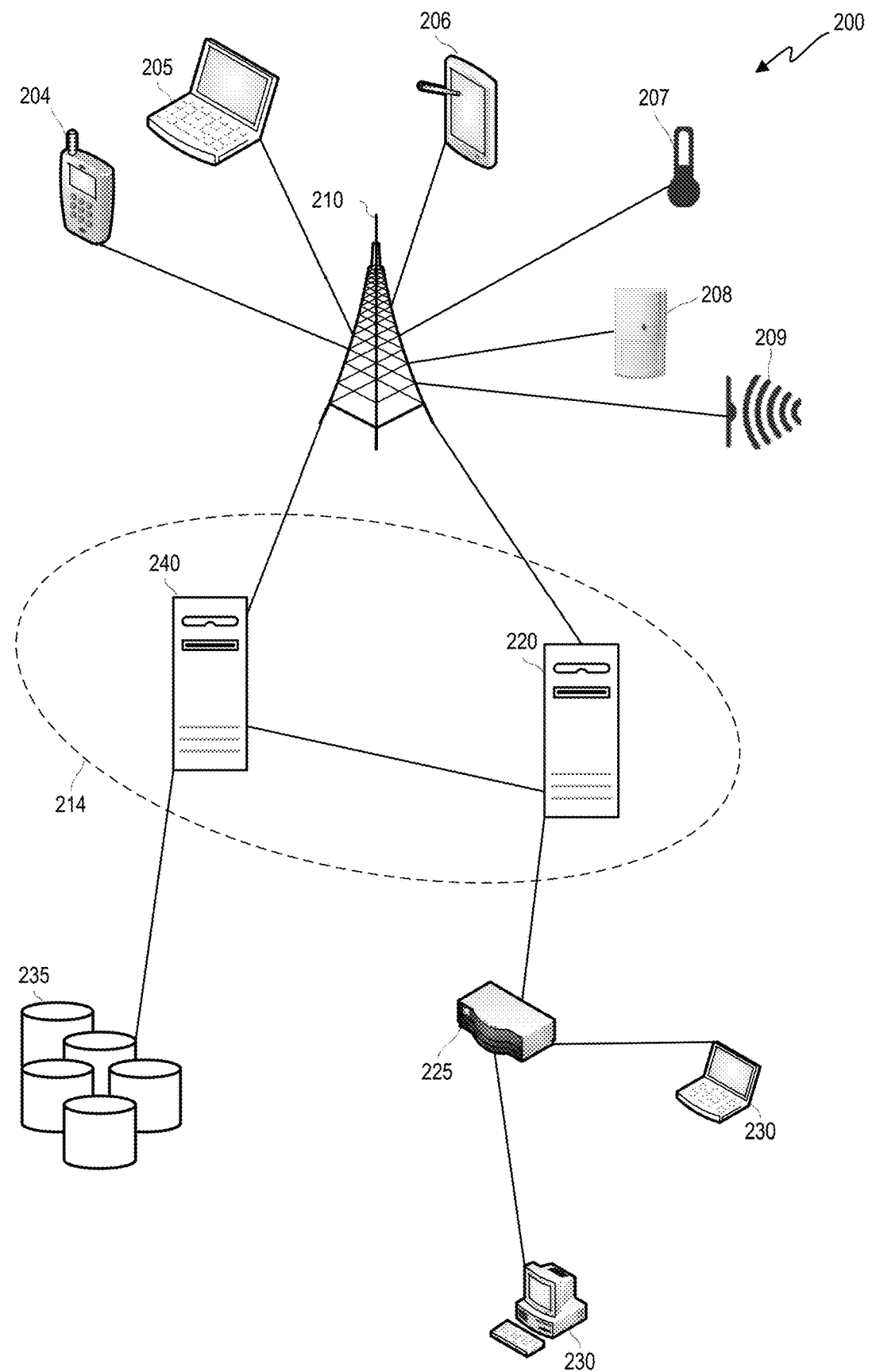
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
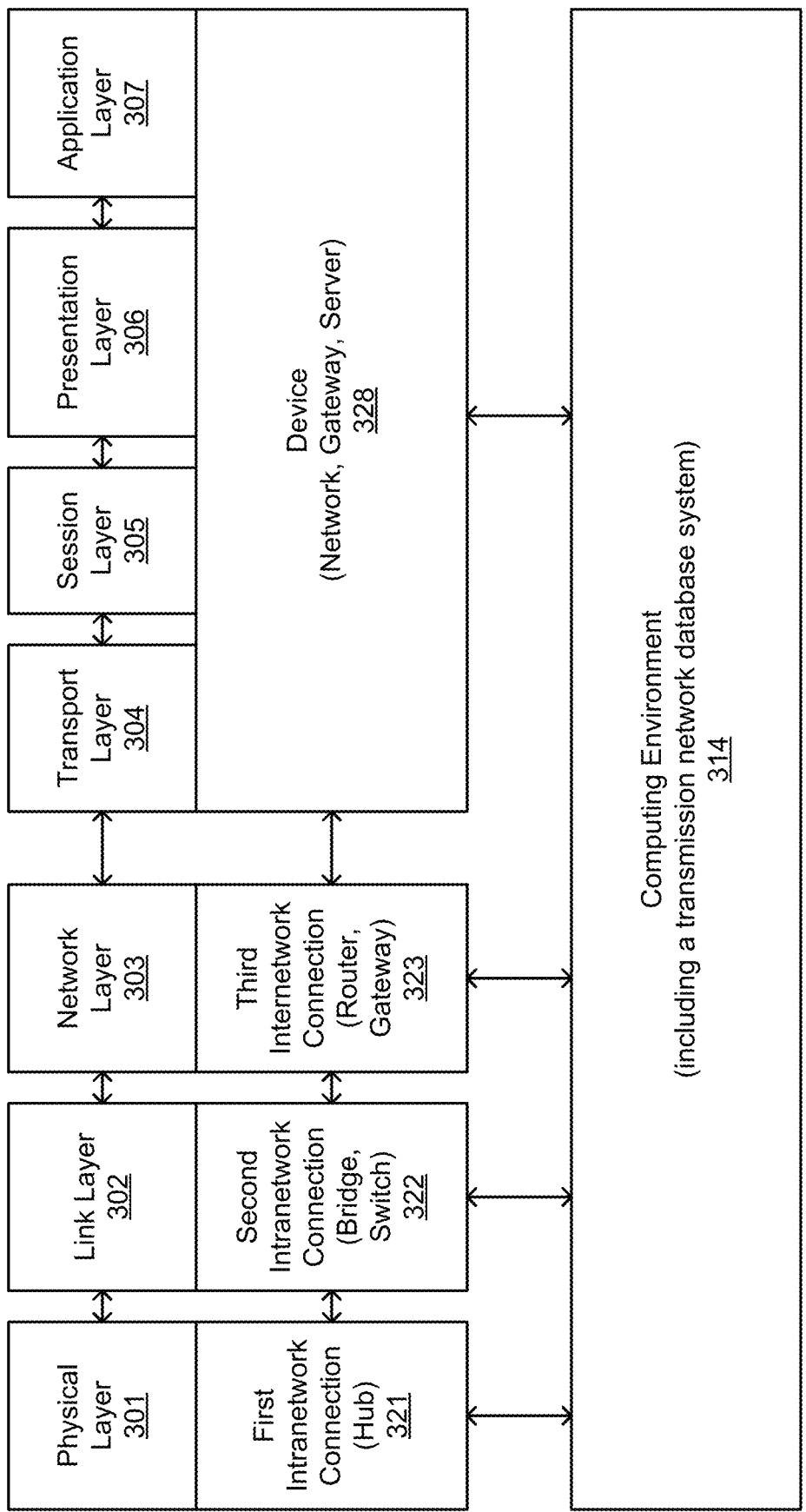
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
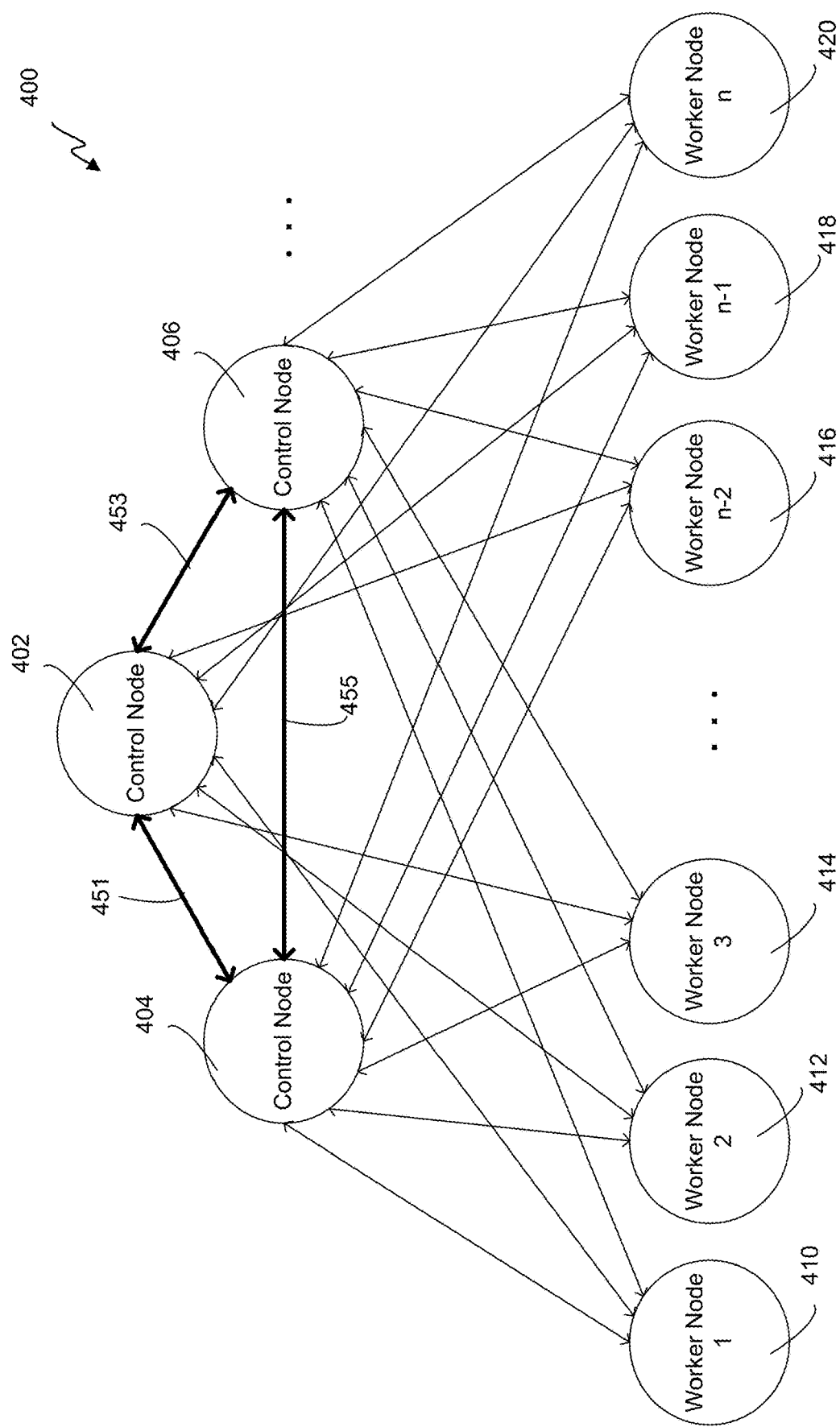
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets.

The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
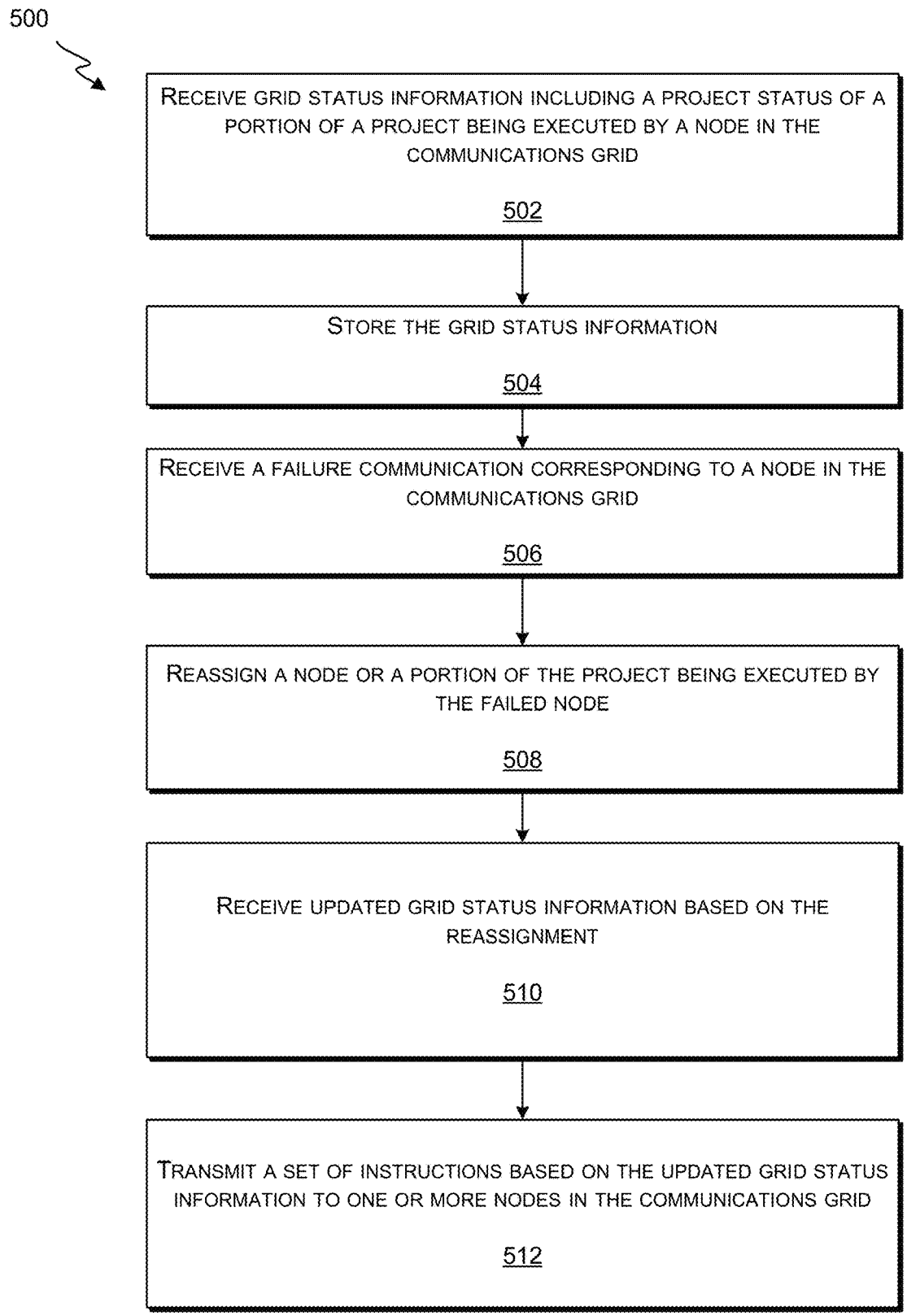
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
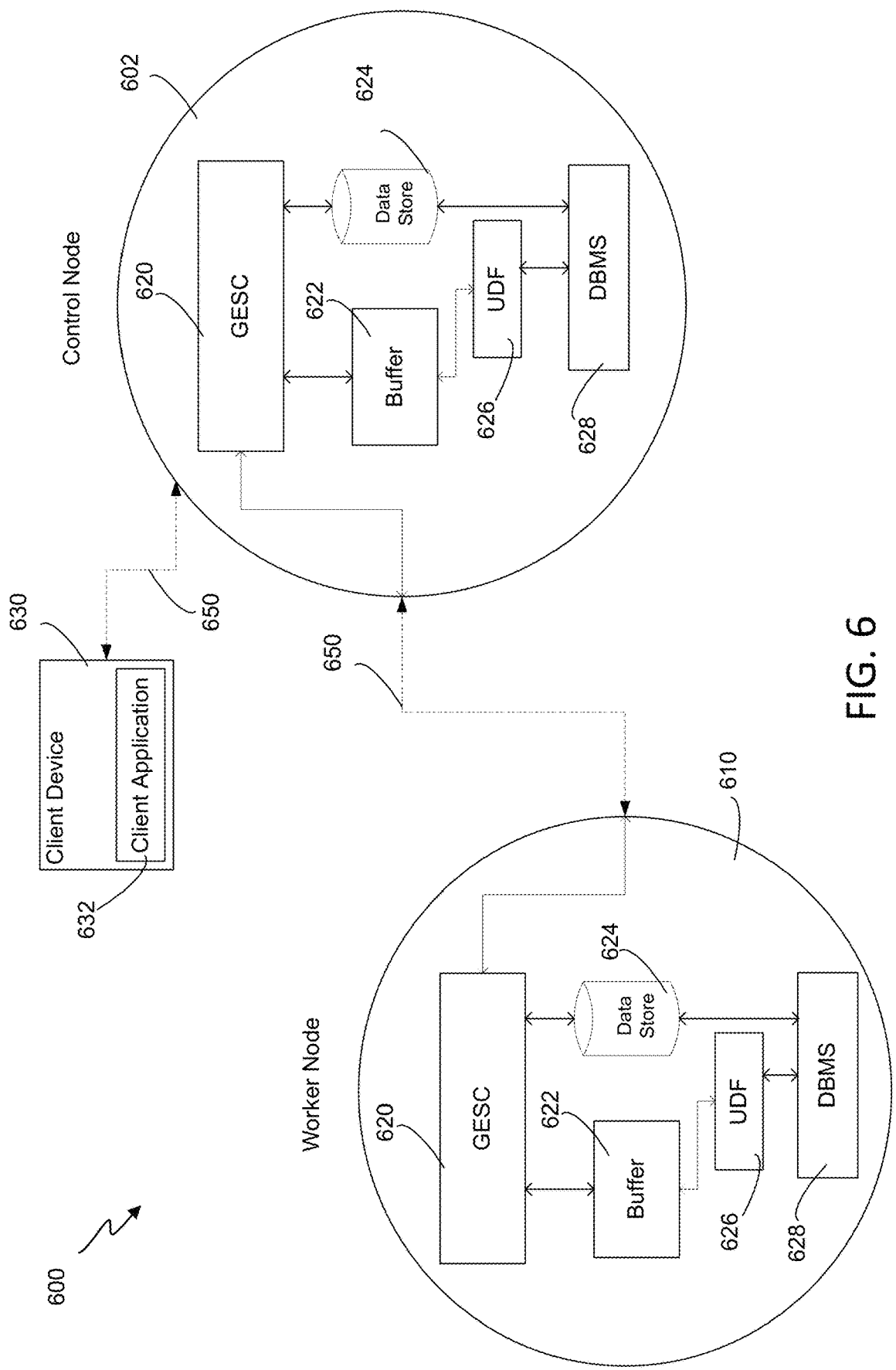
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
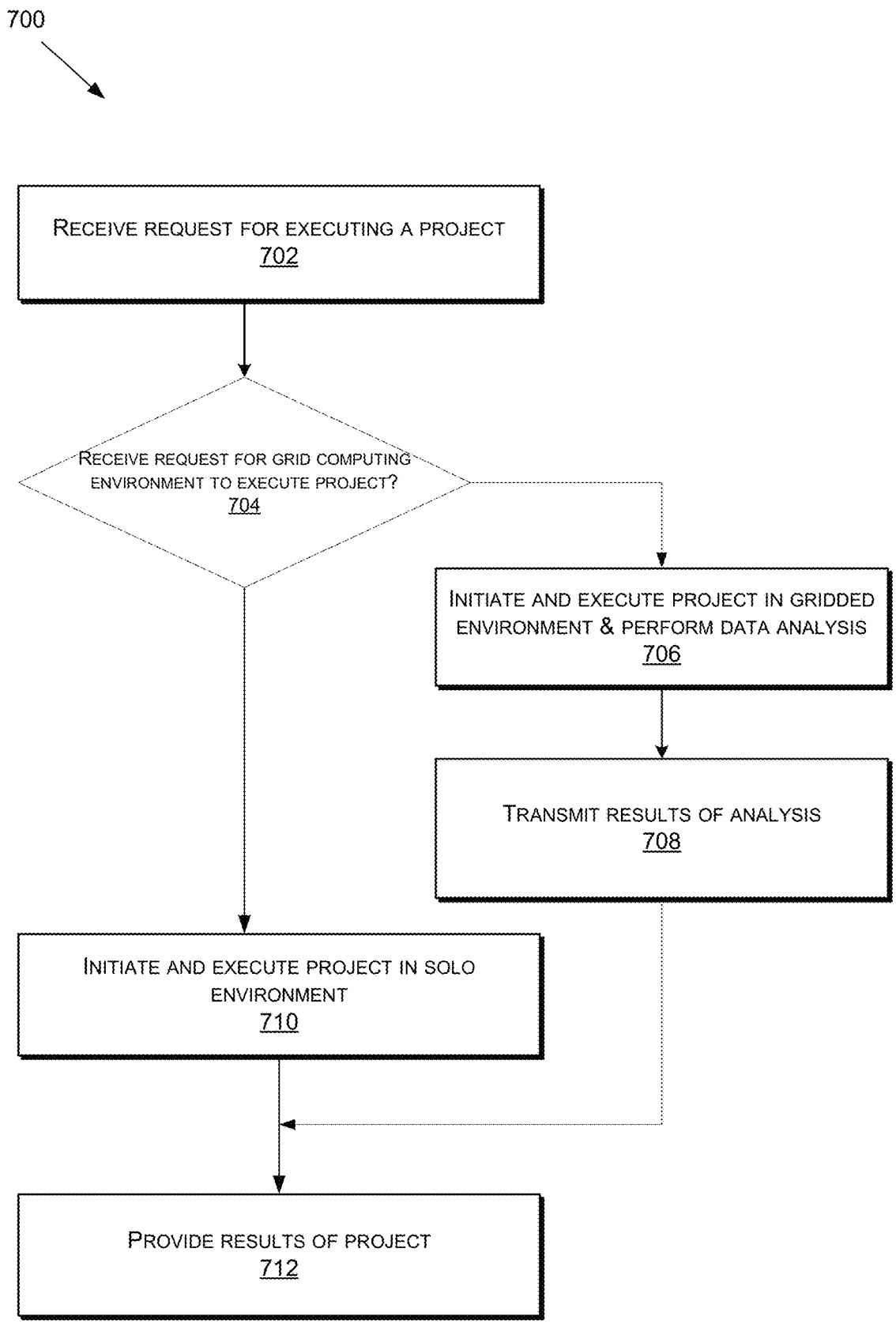
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.). ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
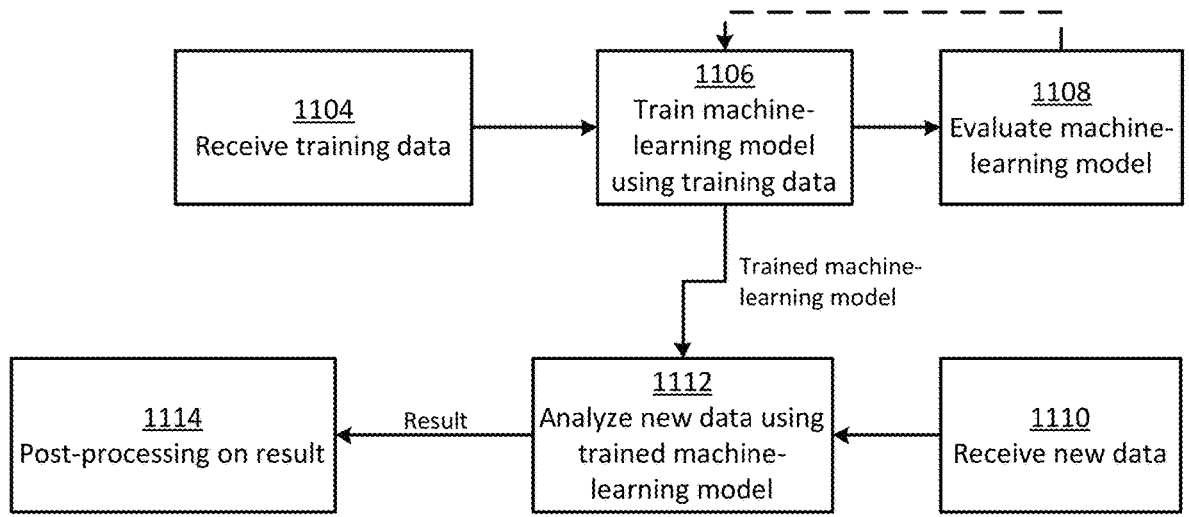
FIG. 11 illustrates a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
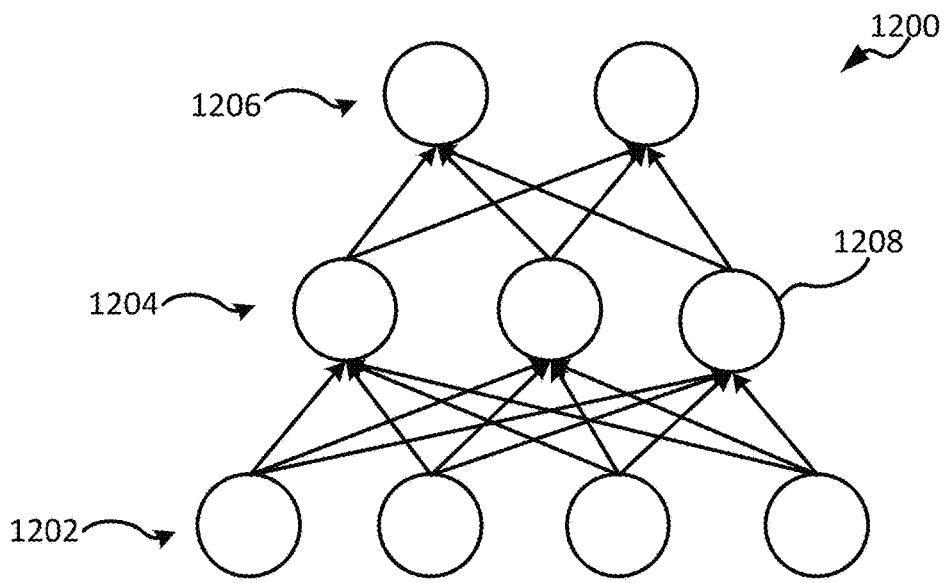
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, processor(s) thermal mitigations, data communication speed improvements, and/or data efficiency targets and improvements throughout various parts of the system when compared to a homogeneous computing architecture that employs CPUs for general purpose computing.

As noted above, it can be difficult to maintain properties for data items in a database when events that trigger changes to the data items are not directly observed but rather must be inferred.

Exemplary embodiments address these and other problems by building an adherence model for a set of data items. Adherence (or compliance or conformance) relates to actions performed on a regular basis, where the actions can affect values of the data items. Although the performance of these actions may not be directly observable by the system, their performance may be inferred from surrounding contextual data. Based on the contextual data, changes to the values of the data item may be inferred and adherence information may be calculated.

This may be accomplished by deriving conditions and inventory-linked condition remediation information from limited available information, matching the conditions to solution classes or types via a customizable mapping, and then calculating adherence for the condition based on the available information. If a data item or a user associated with the data item is found to be non-adherent, an indicator may be sent to an entity responsible for addressing the condition.

The conditions may be derived in an interpolation process which consults available information and derives the conditions (even if the conditions are not explicitly listed in the available information) from surrounding context information.

Based on the interpolation process, a condition may be identified and a solution class linked to the condition may be determined. The solution class may be mapped to the condition in a table, database, or other mapping. This mapping may be static/predetermined, or may be customizable and dynamic.

Using the mapping and the solution class, the data items relating to solutions within the solution class may be updated and/or tracked. The administration of such solutions may be inferred from the limited information available.

Adherence to a solution plan may be determined based on the data values for the solutions in the solution class. Adherence may be determined based on estimated rates of change in the data values if adherence is being followed as expected.

If certain conditions are met, a warning may be sent to a corresponding user and/or a system or other entity responsible for monitoring adherence to the solution. The conditions and actions taken in response to the conditions may be stored in a customizable conditions data structure (such as a conditions table, a conditions list, etc.), which is applied against the data values to identify actions to be taken. Optionally, the data items may be filtered (e.g., to consider only specified problems or remediation plans as a focus).

By accounting for the time-varying nature of adherence on a fine-grained basis, additional analytics may be performed. These analytics might include, for instance, how long a data item was non-adherent over a given time frame (which might be linked to other relevant data), how often the data item was non-adherent over a given time frame, when adherence stopped (which might be useful information to a third party such as a supplier, a user of a system, or a company), etc.

Figure 13A:
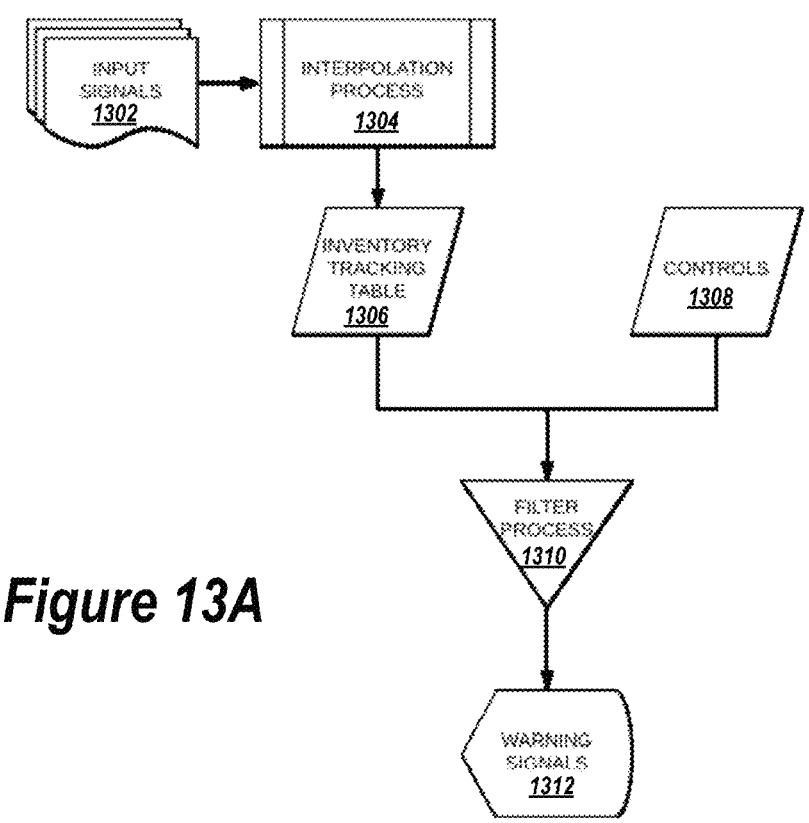
FIGS. 13A-13C are block diagrams showing an exemplary overview of a process for tracking adherence and providing adherence warnings according to an exemplary embodiment.
Figure 13B:
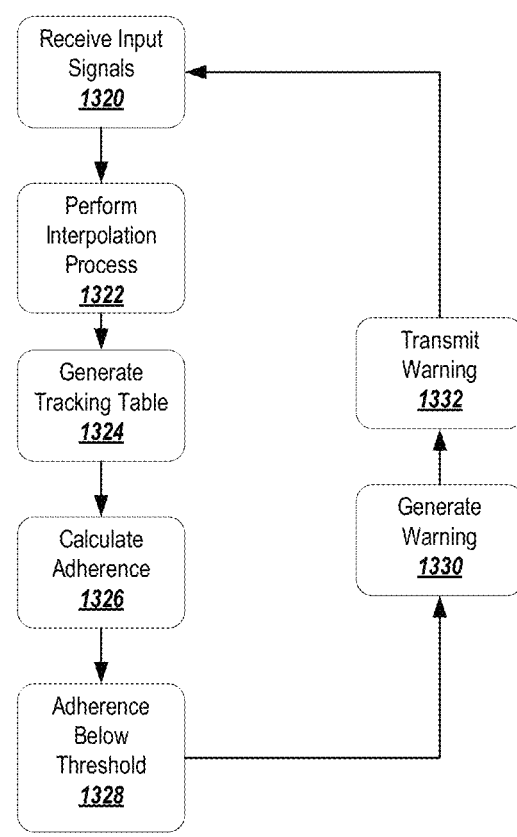

FIGS. 13A and 13B depict an exemplary information flow suitable for use with exemplary embodiments, and an exemplary flowchart of a method suitable for practicing exemplary embodiments, respectively.

Figure 13C:
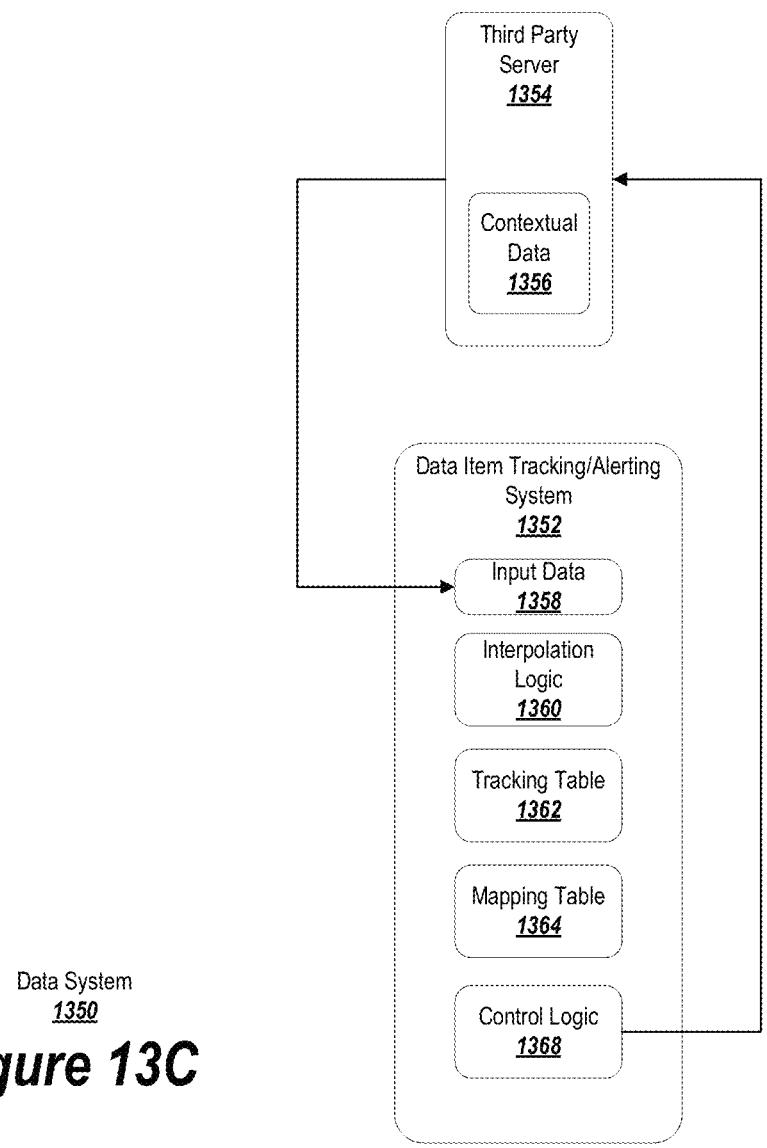

Initially, input signals 1302 are received from one or more input devices (see also block 1320 of FIG. 13B). For instance, the input signals 1302 may originate at one or more third-party servers, as depicted in FIG. 13C. The input signals 1302 may be received over a network, such as the Internet.

The input signals 1302 may include contextual information related to one or more data items. For example, the contextual information may not directly list a change to a value of the data items, but may relate to actions that, when performed, cause the value of the data items to change. The contextual information may be associated with a time or date on which the value of the data items is expected to change.

One example of such contextual information may be a delivery schedule. In this example, the data item may represent a certain product, and may be associated with a value indicating an amount of the product that is available to be sold at a given location. A third-party server may host a delivery schedule indicating when the inventory of the product will be replenished. The delivery schedule may indicate a date or time of delivery and an amount of product scheduled to be delivered.

An interpolation process 1304 may be performed on the input signals 1302 (see also block 1322 of FIG. 13B). The interpolation process 1304 allows information that is not directly present in the input signals 1302, but which is necessary or useful in determining adherence, to be derived. For instance, given certain actions as indicated by the input signals 1302, a value of the data item may be expected to change at a given rate or under certain conditions. The rate or conditions may be known a priori, may be retrieved from a local or remote location, or may be inferred from the context information.

Returning to the above example with the delivery schedule, the date of delivery and amount delivered may be known; however, the amount of inventory available at the location on a given date may not be known, especially if the location does not (or can not) directly track the amount of inventory on hand (consider, e.g., the case where the delivered items are office supplies whose individual inventories are not tracked). The interpolation process in this case may identify an expected rate at which inventory is used or depleted, e.g., based on historical data, estimated data usage, estimated usage rates, prescribed usage rates, etc.

The information gleaned in the interpolation process 1304 may be used to build a tracking data structure 1306 (see also block 1324 of FIG. 13B). The tracking data structure 1306 may be a table, a database, a list, etc. The tracking data structure 1306 may be a single source of information (e.g., a single table) that identifies, on a granular basis as defined by the use case, the value of the data item at a given time. Returning to the example of the office supplies, the interpolation process may identify when a new load of office supplies is received and the expected usage rate of the office supplies, and the tracking data structure 1306 may include an identifier for the data item, an amount of the data item on the date that the data item was originally received, and also an estimated amount of the data item on each day thereafter. The tracking data structure may include multiple rows, each row representing a record for the data item at time points during which the value of the data item is not directly known but must rather be inferred.

Having this information present in a single data structure 1306 allows analytics to be performed on a much more granular basis than could be done if the only record were of the amount of office supplies delivered on a particular date, which is the only recorded or observed information directly available to the system. Computations may be run on a fine-grained basis (e.g., at relatively short intervals where data updates are not necessarily directly observed) in order to infer data characteristics that may not be directly present in updates to the data values.

The tracking data structure 1306 may also apply a mapping data structure to link related categories of data items which are considered to be interchangeable or fungible. In these embodiments, the mapping data structure may map multiple data items (e.g., interchangeable or fungible data items) to a single class or type. Computations, such as adherence calculations, may automatically be run across the class or type, rather than individual data items, even when a computation on a particular data item is called for. This allows the system to account for the interchangeable nature of the data items automatically.

Returning to the office supply example, one data item may be the inventory level of black pens, while another data item may be the inventory of blue pens. When a legal document must be signed, it is important that a permanent solution such as a pen be used, although in most cases black pens are fungible with blue pens. It may be desirable to flag if the level of inventory falls below a certain level, but it may not necessarily be the case that this warning must be sent if only the inventory of black pens falls below the level while the inventory of blue pens remains above the level. Because black pens and blue pens can both be used to fulfill the condition of "signing a legal document," the system may link these two data items together for the purpose of determining adherence to maintaining a certain number of pens in inventory.

The information in the tracking data structure 1306 may be used to perform various analytics on a highly granular scale. Moreover, the information in the tracking data structure 1306 may be linked to or supplemented with contextual information, such as weather data, demographic information, statistical data, etc. For instance, by estimating the inventory level of blue and black pens on a granular (e.g., daily) basis, the system can determine an estimated date on which the number of pens ran out. This information is potentially more useful than knowing when each delivery of pens was received, because it could allow (e.g.) for the absence of pens to be correlated with drops in productivity, and for the effect of non-adherence to maintaining a certain level of pens in inventory on office profits.

In addition to the tracking data structure 1306, various controls 1308 may be defined. The controls 1308 may be customizable and/or may include predefined controls. The controls 1308 may describe operations to be performed on the tracking data structure—for instance, one control 1308 may define a minimum level of inventory for the category of "ink devices," and may cause a warning to be triggered if the collective number of items in this category (e.g., black pens and blue pens) falls below a threshold level. More generally, a control 1308 may define a condition that exists with respect to one or more data values for data items in the tracking data structure, and one or more actions to be taken when the conditions are met (or not met).

At block 1310, a filter process may optionally be performed. The filter process may remove certain data items or classes of data items that are present in the tracking data structure from consideration, so that only the non-filtered data items can cause the controls 1308 to trigger actions. For instance, an office manager may be concerned with the amount of printer paper available to the office at the present time, but may wish to filter out other products (such as pens and pencils) so as to be able to focus on a particular category of items.

The filtered data may be used to calculate adherence values for a data item or class of data items (block 1326 in FIG. 13B). The adherence level may represent a minimum value of a data item or class of data items (e.g., the level of black or blue pens must be maintained above 5), or an amount of percentage of time that the data item or class of data items is permitted to be below the minimum value (e.g., it is permitted to have 0 black or blue pens only for a period of two days). Parameters for the adherence levels may be defined by the controls 1308. The controls 1308 may also be used to determine whether any of the adherence levels are below a threshold value (block 1328 of FIG. 13B).

Thus, warning signals 1312 (e.g., as defined by the controls 1308) may be generated from the filtered data. For any data remaining in the filtered data set after applying the filter process 1310, the controls 1308 may be run to, for example, generate one or more warnings (block 1320 of FIG. 13B). The warnings may be sent (block 1322 of FIG. 13B) to one or more servers or other entities that have registered to receive the warnings (in the above example, the office supervisory and/or office supplies delivery company may register to receive the warnings).

FIG. 13C depicts an example of an environment 1350 suitable for practicing exemplary embodiments.

A data item tracking and alerting system 1352, which may be a server, personal computer, mobile device, or some other type of suitable computing device, may maintain a tracking data structure 1362, as described in the example above. In order to build the tracking data structure 1362, the system 1352 may interact with a third-party server 1354 which hosts contextual data 1356. The tracking data structure 1362 may track changes in the value of a data item on a fine-grained basis (e.g., at regular, relatively small intervals). The contextual data 1356 may include any data which does not directly reflect the changes to the value of the data item on the same fine-grained basis, but may provide information (such as data changes at relatively larger intervals) and/or other information that allows the changes in the value of the data item to be interpolated at the smaller intervals by interpolation logic 1360.

The third-party server 1354 may provide the contextual data 1356 to the data item tracking and alerting system 1352 as input data 1358. After the interpolation logic 1360 uses the input data 1358 to build the tracking data structure, a mapping data structure 1364 may optionally be applied to map remediable conditions to data items and/or classes of data items in the tracking data structure 1362. Control logic 1368 may identify trigger conditions that apply to individual data items, classes of data items (as defined by the mapping logic), and/or remediable conditions. If the trigger conditions are met, the control logic 1368 may cause an action to be taken, such as sending a warning back to the third-party server 1354 or another entity.

One example of a system suitable for practicing exemplary embodiments, in which data changes are not necessarily directly observed, involves an inventory monitoring system. Existing inventory monitoring systems typically register events such as when inventory is replenished; some may also register when a unit of inventory is directly consumed. For instance, an inventory system in a store may register when a shipment of a product is delivered to the store (in which case the inventory is incremented), and when a customer purchases a unit of the product (in which case the inventory is decremented).

However, in some cases the usage of the inventory is not directly observed or accounted for. For example, when a vehicle maintenance shop performs an oil change, the maintenance shop is able to verify that the vehicle's oil life has been reset to 100% on a particular day. It would be desirable for the vehicle shop to know if the user is adhering to a prescribed maintenance schedule by receiving regular oil changes. This information may help to diagnose other problems; for instance, if the engine phasors are out of alignment, one cause could be dirty oil resulting from a missed oil change. However, the shop does not directly observe the vehicle using the oil (consuming units of oil life). Moreover, the shop may not observe other inventory replenishment events, such as when the vehicle owner takes the vehicle to another repair shop or replaces the oil themselves.

Thus, it may be difficult to keep an inventory management system up-to-date in the face of limited available information. Another problem with existing inventory management systems is that, given the limited information available, the inventory management system may not be able to track the time-varying nature of adherence to an inventory replenishment schedule. In the above example, the system may know that an oil change occurred (e.g., on Jan. 1, 2018 and on Aug. 18, 2018), but the inventory system typically would not track the day-by-day oil usage. This information may be useful to various parties, including the repair shop, the vehicle owner, and the owner's insurance company, because the rate of adherence to the maintenance schedule may be predictive of maintenance problems in the future. It would be helpful to know, for example, precisely when the adherence rate drops below a threshold value, how long the adherence rate remained below the value, how often over a period of time adherence was low, etc. This fine-grained information may not be available in existing inventory control systems.

Still further, existing inventory management systems do not account for fungible inventory. If a problem arises that can be addressed by an item in inventory, there may actually be multiple different ways to address the problem. Existing inventory systems may not be able to link problems to solutions in a way that allows a user to see if the lack of inventory contributed to the problem. In other words, existing inventory management systems do not typically account for the fungibility of different products. Thus, such systems may be overly-conservative (e.g., flagging a problem when the inventory of one item goes below a certain level, when the inventory of a fungible product remains within acceptable levels).

For example, lack of fresh oil in a vehicle may cause corrosion in the engine, but corrosion can be caused by other things as well. If a maintenance shop diagnoses a problem with corrosion and treats the problem by changing the oil, it may be important to link the treatment (fresh oil) with the problem (corrosion) so that the status of the problem can be monitored in the future. However, corrosion may be treated by several different solutions—for instance, if the oil change does not appear to be addressing the corrosion issue, the shop may apply an anti-corrosion spray. In this case, it would be helpful to know that both treatments (oil change and anti-corrosion spray) are being used to treat the same condition, so that if the inventory of one drops below a threshold (e.g., the oil life drops below 50%) the shop knows that adherence to the maintenance plan is still being maintained (e.g., because the anti-corrosion spray remains in effect). It may be necessary to replenish the inventory only when adherence to the maintenance plan as a whole (involving both the oil life and the anti-corrosion spray) drops below a specified adherence rate.

Figure 14:
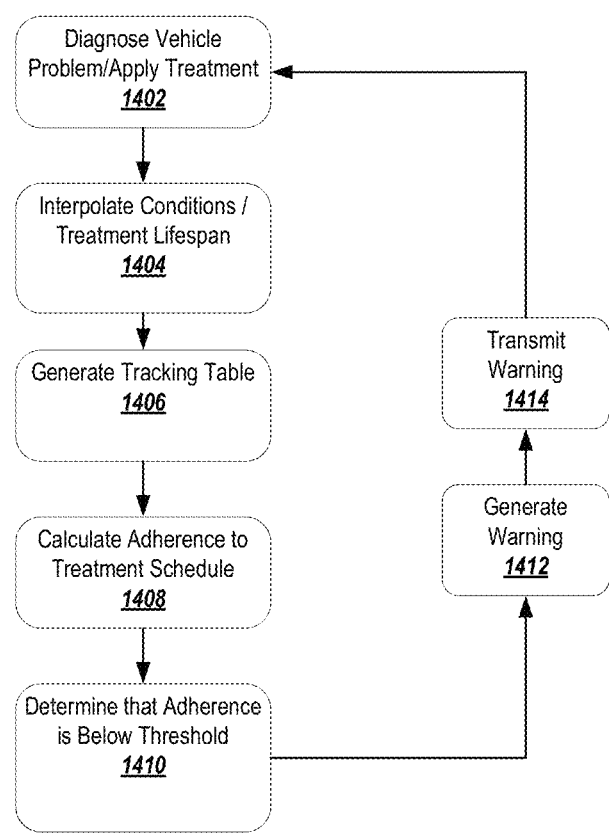
FIG. 14 is a block diagram depicting exemplary data flow through an adherence tracking and alerting system.

An example of a process suitable for use with a data item tracking and alerting system for a vehicle maintenance shop is depicted in FIG. 14. The data item tracking and alerting system may provide automated tracking and interpolation of data items relating to vehicle maintenance, in order to automatically generate warnings when some of the data items fall below a predetermined computational threshold. This may be done on a highly granular basis (e.g., more regularly than observed data item value updates) so that warnings may be generated in a more timely manner, and so that more information is available for analytics. For instance, in exemplary embodiments, data item values may be available on a daily basis, as compared to a conventional system which might only observe data item values when the vehicle is brought into the maintenance shop semi-annually.

At block 1402, the vehicle maintenance shop may diagnose a problem with the vehicle for which treatment may be applied. The vehicle maintenance shop may enter the diagnosis into a maintenance server, and optionally may transmit vehicle claims or warranty data to a vehicle claims adjudication system (or another third-party server). The vehicle maintenance shop may also apply the initial treatment for the problem at this stage. The treatment may be associated with a lifespan (e.g., a certain number of days, or a certain amount of mileage). The diagnosis and treatment information may be entered into a data item tracking and alerting system as input data.

At block 1404, the data item tracking and alerting system may interpolate information from the input data. The interpolated information may include the diagnosed conditions (which may be interpolated from the condition codes and/or treatments), and a currently lifespan of the maintenance treatment at regular intervals at a relatively high level of granularity (e.g., more regular than the directly observable information, which may involve the application of the treatment at weekly or monthly intervals). For instance, the lifespan of the maintenance treatment may be calculated on a daily or weekly basis. The lifespan may be interpolated from known or estimated usage patterns, such as how much lifespan is likely to be removed daily for the average vehicle, or how much lifespan is likely to be removed at regular intervals based on known information about the particular vehicle in question (which may be interpolated, e.g., from odometer records stored in the maintenance shop's database).

At block 1406, this information may be stored in a suitable tracking data structure. Optionally, a mapping may be applied to map the interpolated conditions to a treatment class, and to map the treatment class to particular treatments. This information may be used to calculate adherence in block 1408.

More specifically, based on the information in the treatment data structure and any conditions associated with the data item tracking and alerting system, the system may calculate adherence to a treatment schedule. Adherence may be defined as maintaining a certain level of lifespan for the treatment class, or only allowing the lifespan of the treatment class to drop to a predetermined threshold, such as 10% or 0%, for a limited period of time (among other possibilities).

At block 1410, the system may determine whether the adherence calculated in block 1408 has dropped below an acceptable threshold. If so, a warning may be generated at block 1412, and the warning may be transmitted to relevant entities at block 1414. The relevant entities may include the vehicle owner, the repair shop, a dealership, an insurance server, etc.

It is noted that inventory need not be limited to products, but may also include services or other items. For example, in one embodiment, the system may treat computer storage capacity, computing processing resources, or network bandwidth as an inventory-able item. Data items representing these computing resources may be associated with values, such as number of gigabytes of storage capacity available, processor utilization ratios, network uptime, network transmission rates, network drop rates, etc. The system may interpolate values for these data items on a highly granular basis that is more frequent than those directly observed by the computing system. For example, the computing system may only be able to estimate network bandwidth when data packets are received on the network. The system may apply one or more models, simulations, estimated usage rates, etc. to interpolate the state of the network in between packet arrivals, allowing for more fine-grained analysis to be performed. On the basis of this analysis, additional computing resources may be provisioned, or existing computing resources may be reallocated, in order to improve the efficiency, uptime, etc. of the computing system.

Other exemplary embodiments may be used to track other types of inventory, such as services (e.g., time spent by a doctor caring for patients), products (e.g., diabetic test strips), inventory in a brokered marketplace (e.g., the number of men or women on a dating website), maintenance lifespans (e.g., the time since the last inspection by a utility company of power lines or transformers), vehicle inventory for a vehicle sharing service, as well as many other types of inventory.

As noted above, the present solution is not limited to vehicle maintenance inventory, but may be used in connection with any type of inventoried asset, including products, services, and other assets.

Another embodiment discussed herein relates to medication adherence, although, as noted above, exemplary embodiments are not so limited. For different uses, different types of input data, models, filters, and output signals may be used; these will be readily apparent to one of ordinary skill in the art based on the intended application of the technology.

To take medication adherence as an example, a provider, such as a primary care provider (PCP), may have access to information such as medical claims data. However, it may be difficult for the provider to determine how well a patient is adhering to their chronic medications from claims data alone. This determination is difficult in the face of the many available approaches regarding when and how to compute adherence as well as the various sources of data needed to calculate medication adherence. Even if the healthcare provider is able to determine that a patient has not refilled their prescription every 30 days, the healthcare provider may not know if this is because the patient was not taking their prescription, or because the patient was hospitalized and the hospital provided their medication, or because the patient was switched to a different medication for treating the same chronic condition.

Moreover, even the most basic information may not be readily available to the service provider. For instance, if a doctor wished to know how often a patient was refilling their prescription, the doctor would likely need to dig into the patient's medical claims records themselves. The doctor is not likely to have information that may be useful, such as information from the pharmacy at which the prescription was filled. More generally, no automated system may be in place for notifying PCPs of patient's non-adherence using healthcare data. Even when pharmacy or claims information may be available, existing systems only provide a summary of the patient's adherence using days supply and fill dates; they do not allow for easy identification of the time-varying nature of medication use. For example, existing systems do not allow for further evaluation regarding when a patient stopped adhering, or how often a patient had gaps in adherence. Furthermore, no system is in place to report these adherence values back to the patients' PCP.

Thus, an exemplary embodiment may build a medication adherence model by deriving chronic conditions and facility stay information from medical claims, and restricting pharmacy claims to relevant prescriptions by matching medical conditions to drug therapeutic classes via a customizable mapping. Medical claims along with pharmacy claims are used to determine when a patient is filling prescriptions for drugs in certain drug therapeutic classes for a related medical condition based on the patient's medical history. These claims are then used to calculate medication adherence for that medical condition. If a patient is found to be non-adherent, an indicator alert is sent to the patient's PCP (identified using the medical claims data) informing the provider of the drop in adherence.

As described in more detail herein, exemplary embodiments may convert input signals, such as insurance claims data, prescription fulfillment data, etc. into an inventory tracking database via an interpolation process. The interpolation process may involve creating a set of data structures that map patients, chronic conditions, drug therapeutic classes, and pharmacy data. Together with a set of stated controls, the inventory tracking data structure is filtered through a filter process to produce output warning signals.

This process allows multiple medication adherence calculations to be performed with a single data structure, and creates a daily pill supply calendar for each patient according to medical condition or therapeutic drug class. Using this updated data structure, the time-varying nature of medication adherence can be better determined. The updated data structure may be used to identify patient and provider characteristics associated with medication adherence, to examine how medication adherence impacts healthcare costs, and to identify health outcomes associated with non-adherence (e.g., emergency room visits, hospital admissions).

Thus, exemplary embodiments provide a system for building an adherence model that allows multiple medication adherence calculations to be performed in real time, on arbitrary dates, with a single data structure. This may be accomplished by deriving conditions and treatment information from available information (such as medical claims information and pharmacy claims information), matching the conditions to therapy classes or types via a customizable mapping, and then computing adherence for the condition based on the available information. If a user is found to be non-adherent, an indicator may be sent to an entity responsible for addressing the condition.

The proposed system allows for both traditional computations of adherence as well as the ability for greater insight into adherence with access to daily pill supply and facility stay information. Furthermore, it allows providers the ability to be informed if their patients fail to fill their medication as prescribed. The proposed medication adherence system automatically (e.g., without human intervention) connects patient conditions to their prescriptions, allows for more flexible, real-time computations of medication adherence, and allows providers more visibility of their patients adherence to chronic medication. The proposed system is more flexible because it allows multiple options for: (1) selecting a window of time to summarize adherence, (2) determining how to incorporate facility stay information, and (3) identifying gaps in medication usage. Using the proposed system allows providers to identify specific information such as: (1) medication adherence metrics, (2) what day a patient ran out of medicine, (3) how many days in a row a patient was without medication, and (4) how often were there medication gaps between prescriptions. This is done in a highly granular way that leverages computing power to interpolate data values between direct observations, allowing more fine-grained (and, indeed, entirely different) analytics to be performed that would not be possible with conventional systems. For example, understanding gaps in medication usage at a more granular level, as enabled by the exemplary embodiments described herein, may better identify patients in need of medication adherence support, and may be helpful for identifying factors that influence patients to return to being adherent after periods of non-compliance.

Moreover, this information may be useful to other entities, such as regulators, insurance providers, etc. Non-adherence may lead to higher costs, increased risks such as hospitalization, accidents, and/or part failures. Given the significant health and financial impacts of non-adherence, it may be important to have a system in place to effectively identify and alert interested parties of non-adherent users of their services.

Figure 15:
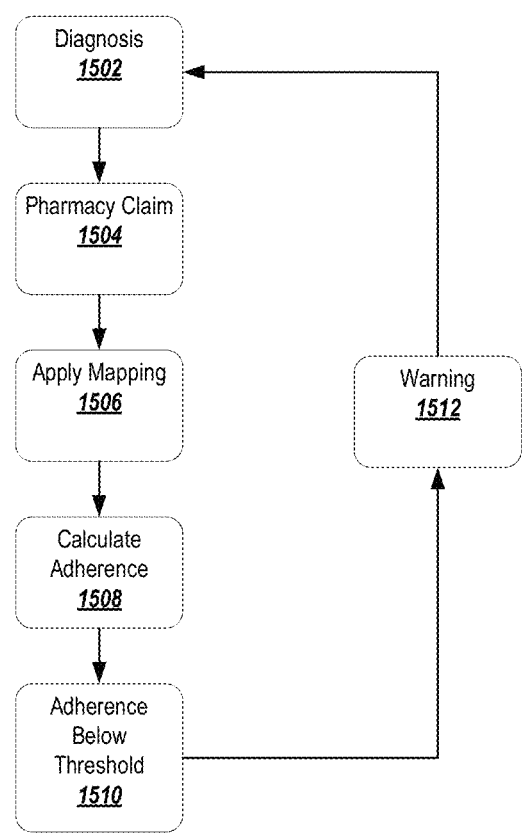
FIG. 15 is a flow chart depicting an exemplary method for tracking adherence and providing adherence warnings according to an exemplary embodiment.

FIG. 15 depicts a general overview of this process as applied to determining medication adherence; in this particular example, the condition is a chronic medical condition and the treatment is a prescribed medication (or medications).

At block 1502, a primary care provider may diagnose a chronic condition and prescribe a medication regimen. One or more medical insurance claims may be submitted for the diagnosis, which may refer to the chronic condition based on a diagnosis code. For instance, Table 1 shows exemplary medical claims data for a given individual.

TABLE 1

Medical Claims

| Patient Name | Patient ID | Start Date of Service | End Date of Service | Diagnosis Code | Facility Claim |
|---|---|---|---|---|---|
| Jane Smith | 13241 | Mar. 11, 2013 | Mar. 11, 2013 | 401.1 | N |
| Jane Smith | 13241 | Jun. 15, 2013 | Jun. 15, 2013 | 496 | N |
| Jane Smith | 13241 | Jun. 28, 2013 | Jun. 28, 2013 | 492.8 | N |
| Jane Smith | 13241 | Aug. 17, 2013 | Aug. 17, 2013 | 401.1 | N |
| Jane Smith | 13241 | Sep. 9, 2013 | Sep. 9, 2013 | 496 | N |
| Jane Smith | 13241 | Oct. 20, 2013 | Oct. 20, 2013 | 491.20 | N |
| Jane Smith | 13241 | Dec. 1, 2013 | Dec. 1, 2013 | 496 | N |
| Jane Smith | 13241 | Dec. 15, 2013 | Dec. 17, 2013 | 296.31 | Y |
| Jane Smith | 13241 | Dec. 17, 2013 | Dec. 17, 2013 | 401.1 | N |
| Jane Smith | 13241 | Dec. 20, 2013 | Dec. 20, 2013 | 496 | N |
| Jane Smith | 13241 | Feb. 13, 2014 | Feb. 13, 2014 | 491.20 | N |
| Jane Smith | 13241 | Apr. 27, 2014 | Apr. 27, 2014 | 496 | N |
| Jane Smith | 13241 | May 1, 2014 | May 1, 2014 | 401.1 | N |

As shown, the medical claims information may list the patient name and/or an identifier of the patient, the date(s) on which the medical service (e.g., a diagnosis) was performed, a code corresponding to the diagnosis, and whether the claim is associated with a facility (such as a hospital).

At block 1504, the patient may fill their prescription with a pharmacy, in which case a pharmacy insurance claim may be submitted. The pharmacy claim may list the date(s) that the prescription was filled and the number of days' supply of the medication. An example of pharmacy claims data is depicted below in Table 2.

TABLE 2

| Pharmacy Claims Patient Name | Patient ID | Filled Date | NDC | Therapeutic Class | Days Supply | Prescribed Date |
|---|---|---|---|---|---|---|
| Jane Smith | 13241 | Apr. 18, 2014 | 00456402001 | Central Nervous System Agents | 30 | Jan. 1, 2014 |
| Jane Smith | 13241 | May 12, 2014 | 60951065370 | Central Nervous System Agents | 30 | Jan. 29, 2014 |
| Jane Smith | 13241 | May 21, 2014 | 00456402001 | Central Nervous System Agents | 30 | Mar. 19, 2014 |
| Jane Smith | 13241 | Mar. 14, 2013 | 00378023101 | Cardiovascular Drug | 30 | Mar. 11, 2013 |
| Jane Smith | 13241 | May 12, 2013 | 00378023101 | Cardiovascular Drug | 30 | Mar. 11, 2013 |
| Jane Smith | 13241 | Feb. 27, 2014 | 00378023101 | Cardiovascular Drug | 90 | Jun. 2, 2013 |
| Jane Smith | 13241 | Mar. 10, 2014 | 00378015201 | Cardiovascular Drug | 90 | Nov. 27, 2013 |
| Jane Smith | 13241 | Mar. 22, 2014 | 00378162001 | Autonomic Drugs | 30 | Feb. 13, 2013 |
| Jane Smith | 13241 | May 3, 2014 | 00378162001 | Autonomic Drugs | 30 | May 1, 2014 |

As can be seen from the above, the available medical and pharmacy claims data does not indicate which chronic condition (corresponding to a diagnosis code) is being treated by which medication. The information from the diagnosis 1402 and pharmacy claims 1404 may be used as input data into an adherence/inventory tracking system. At block 1406, the system may apply a chronic condition mapping tool to link chronic conditions and medication data for the adherence calculation.

At block 1508, the system may calculate medication adherence for each chronic condition according to a suitable adherence metric, and at block 1410 the system may determine if the patient's adherence has fallen below a predetermined threshold value. If so, then at block 1412 a warning may be generated and transmitted back to the patient's primary care provider; these actions are described in more detail in connection with FIG. 15.

Figure 16:
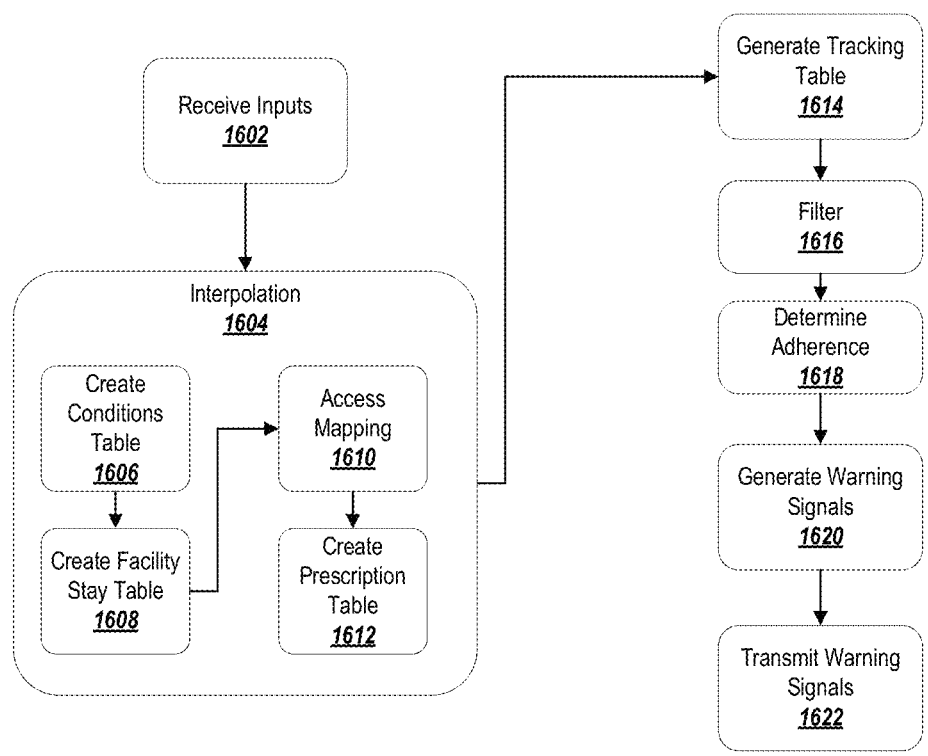
FIG. 16 is a flow chart depicting an exemplary interpolating data, building a tracking data structure, and applying controls according to an exemplary embodiment.

FIG. 16 depicts an exemplary process for analyzing, monitoring, and acting upon adherence data. The actions described in connection with FIG. 15 may be embodied as executable logic stored on a non-transitory computer readable medium and/or an apparatus, such as the tracking/alerting system depicted in FIG. 16.

At block 1602, the system may receive one or more inputs. The inputs may include medical claims data and/or prescription claims data. In other embodiments, the inputs may include any suitable input information relevant to the type of adherence being tracked (such as car oil change records, utilities maintenance records, etc.).

At block 1604, an interpolation process may be performed to derive adherence information from the input information. In the medical example, the interpolation process 1604 may involve creating a data structure 1606 of patients and their chronic conditions using the diagnosis codes from a given patient's medical claims. An example of such a conditions data structure is shown below in Table 3:

TABLE 3

| Patient ID | Start Date | Condition |
|---|---|---|
| 13241 | Mar. 11, 2013 | Hypertension |
| 13241 | Jun. 15, 2013 | Chronic Obstructive Pulmonary Disease and Bronchiectasis |
| 13241 | Dec. 15, 2013 | Depression |

Next, a data structure 1608 may be created identifying patients and their facility stay information from the patient's medical claims. An example of such a facility stay data structure 1608 is shown below in Table 4:

TABLE 4

| Patient ID | Admit Date | Discharge Date | Length of Stay |
|---|---|---|---|
| 13241 | Dec. 15, 2013 | Dec. 17, 2013 | 3 |

At block 1610, the system may access a mapping of chronic conditions to drug therapeutic classes, which may be predetermined and stored in the system, or which may be generated dynamically (e.g., using machine learning techniques). For instance, in some cases a particular drug may belong to several therapeutic classes (e.g., it may be used to treat several conditions). Extrinsic information, such as other drugs taken by the patient, other conditions the patient is known to have, etc. may be used to select one therapeutic class corresponding to a chronic condition the patient is deemed likely to have. An example of such a mapping is shown below in Table 5:

TABLE 5

| Chronic Condition | Therapeutic Class |
|---|---|
| Chronic Obstructive Pulmonary Disease and Bronchiectasis | Autonomic Drugs |
| Depression | Central Nervous System Agents |
| Hypertension | Cardiovascular Drugs |

At block 1612, a further data structure may be created that contains pharmacy claims with prescriptions whose drug therapeutic class matches to the patient's chronic conditions, using the mapping described above. An example of such a prescription data structure is shown below in Table 6:

TABLE 6

| Pharmacy Claims Patient Name | Patient ID | Filled Date | NDC | Therapeutic Class | Days Supply | Prescribed Date |
|---|---|---|---|---|---|---|
| Jane Smith | 13241 | Apr. 18, 2014 | 00456402001 | Central Nervous System Agents | 30 | Jan. 1, 2014 |
| Jane Smith | 13241 | May 12, 2014 | 60951065370 | Central Nervous System Agents | 30 | Jan. 29, 2014 |
| Jane Smith | 13241 | May 21, 2014 | 00456402001 | Central Nervous System Agents | 30 | Mar. 19, 2014 |
| Jane Smith | 13241 | Mar. 14, 2013 | 00378023101 | Cardiovascular Drug | 30 | Mar. 11, 2013 |
| Jane Smith | 13241 | May 12, 2013 | 00378023101 | Cardiovascular Drug | 30 | Mar. 11, 2013 |
| Jane Smith | 13241 | Feb. 27, 2014 | 00378023101 | Cardiovascular Drug | 90 | Jun. 2, 2013 |
| Jane Smith | 13241 | Mar. 10, 2014 | 00378015201 | Cardiovascular Drug | 90 | Nov. 27, 2013 |
| Jane Smith | 13241 | Mar. 22, 2014 | 00378162001 | Autonomic Drugs | 30 | Feb. 13, 2013 |
| Jane Smith | 13241 | May 3, 2014 | 00378162001 | Autonomic Drugs | 30 | May 1, 2014 |

At block 1614, a tracking data structure may be created. The tracking data structure may identify the patient, chronic condition, therapeutic class, drug (NDC), filled date, days supply, current days supply, inpatient stay information, and adherence date for each day a patient is being examined for adherence. In one embodiment, the time frame in which the patient is examined for adherence begins with the first fill date for a drug in a therapeutic class for a given condition and extends for 365 days following that filled date. An example of a tracking data structure is shown below in Table 7:

TABLE 7

| Patient ID | Chronic Condition | Therapeutic Class | NDC | Filled Date | Adherence Date | Dispensed Days Supply | Current on-hand Days Supply | In Facility |
|---|---|---|---|---|---|---|---|---|
| 13241 | Depression | Central Nervous System Agents | 00456402001 | Apr. 18, 2014 | Apr. 18, 2014 | 30 | 30 | N |
| 13241 | Depression | Central Nervous System Agents | 00456402001 | | Apr. 19, 2014 | 0 | 29 | N |
| 13241 | Depression | Central Nervous System Agents | 00456402001 | | Apr. 20, 2014 | 0 | 28 | N |
| ... | ... | ... | ... | ... | ... | ... | ... | ... |
| 13241 | Depression | Central Nervous System Agents | 00456402001 | | May 15, 2014 | 0 | 3 | N |
| 13241 | Depression | Central Nervous System Agents | 00456402001 | | May 16, 2014 | 0 | 2 | N |
| 13241 | Depression | Central Nervous System Agents | 00456402001 | | May 17, 2014 | 0 | 1 | N |
| 13241 | Depression | Central Nervous System Agents | 00456402001 | | May 18, 2014 | 0 | 0 | N |
| 13241 | Depression | Central Nervous System Agents | 00456402001 | | May 19, 2014 | 0 | 0 | N |

TABLE 7-continued

| Patient ID | Chronic Condition | Therapeutic Class | NDC | Filled Date | Adherence Date | Dispensed Days Supply | Current on-hand Days Supply | In Facility |
|---|---|---|---|---|---|---|---|---|
| 13241 | Depression | Central Nervous System Agents | 00456402001 | | May 20, 2014 | 0 | 0 | N |
| 13241 | Depression | Central Nervous System Agents | 00456402001 | May 21, 2014 | May 21, 2014 | 30 | 30 | N |
| 13241 | Depression | Central Nervous System Agents | 00456402001 | | May 22, 2014 | 0 | 29 | N |
| 13241 | Depression | Central Nervous System Agents | 00456402001 | | May 23, 2014 | 0 | 28 | N |
| ... | ... | ... | ... | ... | ... | ... | ... | ... |
| 13241 | Depression | Central Nervous System Agents | 00456402001 | | Jun. 17, 2014 | 0 | 3 | N |
| 13241 | Depression | Central Nervous System Agents | 00456402001 | | Jun. 18, 2014 | 0 | 2 | N |
| 13241 | Depression | Central Nervous System Agents | 00456402001 | | Jun. 19, 2014 | 0 | 1 | N |
| 13241 | Depression | Central Nervous System Agents | 00456402001 | | Jun. 20, 2014 | 0 | 0 | N |
| 13241 | Depression | Central Nervous System Agents | 00456402001 | | Jun. 21, 2014 | 0 | 0 | N |
| 13241 | Depression | Central Nervous System Agents | 00456402001 | | Jun. 22, 2014 | 0 | 0 | N |
| ... | ... | ... | ... | ... | ... | ... | ... | ... |
| 13241 | Depression | Central Nervous System Agents | 00456402001 | | Apr. 27, 2015 | 0 | 0 | N |

At block 1516, the system may apply one or more filters, which may be defined by the aforementioned control data structure. For example, the control data structure may cause the tracking data structure to be filtered so that records pertaining to all but one specified chronic condition, treatment class, or medication are not considered (e.g., the control data structure may request that the analysis focus solely on one chronic condition, such a depression).

Control filters may also define other actions to be taken when a record in the tracking data structure meets certain conditions. For example, the control filters may specify warnings to be sent to a patient's primary physician; these warnings may be adherence related, or may relate to other conditions that are not adherence related. An example of a data structure specifying control filters is depicted below in Table 8.

Control filters may be customizable, and may reflect rules that apply to the establishment of the tracking data structure. For instance, the control filters may define behaviors for when the patient is hospitalized. Typically, if the patient is indicated as hospitalized on a given day, the hospital will administer all medications to the patient and so it is not necessary to decrement the patient's supply of a medication. However, on the day that the patient is admitted to the hospital, and on the day that the patient leaves the hospital, this may not be the case (e.g., the patient may have taken their medication before being admitted to the hospital or after leaving the hospital, meaning that the patient's supply of medication should be decremented on these days). Control filters allow a user to customize the rules for modifying the patient's day-by-day supply of pills in these and other scenarios.

Next, at block 1618 the system may determine medication adherence by using the date for adherence and current medication supply from the medication supply data structure. This information may be used to calculate the proportion of days covered (PDC), which represents a percentage

TABLE 8

| Control Name | Control Description | Warning sent to patient's primary physician |
|---|---|---|
| Low Supply | Flag when medication supply falls below 10 days supply from chronic medication (examples include: antihypertensive, statins, insulin) | Patient has low supply for chronic medication - 'MEDICATION NAME' |
| Beer's violation | Flag when patient over the age of 65 is prescribed any medication on the non-approved Beer's criteria list | Patient has been prescribed a medication that is on the non-approved Beer's criteria list - 'MEDICATION NAME' |
| Low MPR | Flag when medication adherence as measured by Medication Possession Ratio (MPR) falls below .8 for a chronic condition | Patient has a low adherence for chronic condition medication - 'CHRONIC CONDITION' |
| Outlier days supply | Flag when days supply is an outlier relative to other patients with a give medication | Patient has unusual days supply - 'MEDICATION NAME' - 'DAYS SUPPLY' | or ratio of days that the patient was "covered" by their prescribed medication as compared to a total number of days examined. This information may further be used to determine the medication possession ratio (MPR), which is similar to PDC but less conservative (in that MPR represents a sum of the days' supply for all prescription fills in a period as compared to the amount of time in the period). This information may also be used to determine facility-stay-adjusted PDC and MPR values, which accounts for time that the patient is in a facility (e.g., hospitalized) that administers their medication for them. The system may generate an adherence data structure describing this information; an example of such a data structure is depicted below in Table 9:

TABLE 9

| Patient ID | Condition | Therapeutic Class | Medication Possession Ratio (MPR) | Proportion Days Covered (PDC) | MPR Adjusted | PDC Adjusted |
| --- | --- | --- | --- | --- | --- | --- |
| 13241 | Chronic Obstructive Pulmonary Disease and Bronchiectasis | Autonomic Drugs | 0.167 | 0.167 | 0.168 | 0.168 |
| 13241 | Depression | Central Nervous System Agents | 0.250 | 0.250 | 0.252 | 0.252 |
| 13241 | Hypertension | Cardiovascular Drugs | 0.67 | 0.194 | 0.672 | 0.196 |

At block 1620, the system may determine whether patient adherence has dropped below a predetermined threshold (e.g., 80%) for a given chronic condition. If so, an automatic alert may be sent to the patient's PCP notifying them of the non-adherence at block 1522. Examples of such warnings are depicted below in Table 10:

TABLE 10

| Control Name | Patient ID | Flag Date | Warning sent to patient's primary physician |
| --- | --- | --- | --- |
| Low Supply | 13241 | May 8, 2014 | Patient has low supply for chronic medication - 'NDC = 00456402001' |
| Low MPR | 13241 | Mar. 22, 2015 | Patient has low adherence for chronic condition medication - 'Chronic Obstructive Pulmonary Disease and Bronchiectasis' - Medication Possession Ratio = .167 |
| Low MPR | 13241 | Mar. 14, 2014 | Patient has low adherence for chronic condition medication - 'Depression'-Medication Possession Ratio = .25 |
| Low MPR | 13241 | Apr. 18, 2015 | Patient has low adherence for chronic condition medication - 'Hypertension"-Medication Possession Ratio = .67 |

Note that warnings may also be sent in response to other control filters that are not directly adherence related (such as in the "Beer's Violation" case in Table 8).

Figure 17:
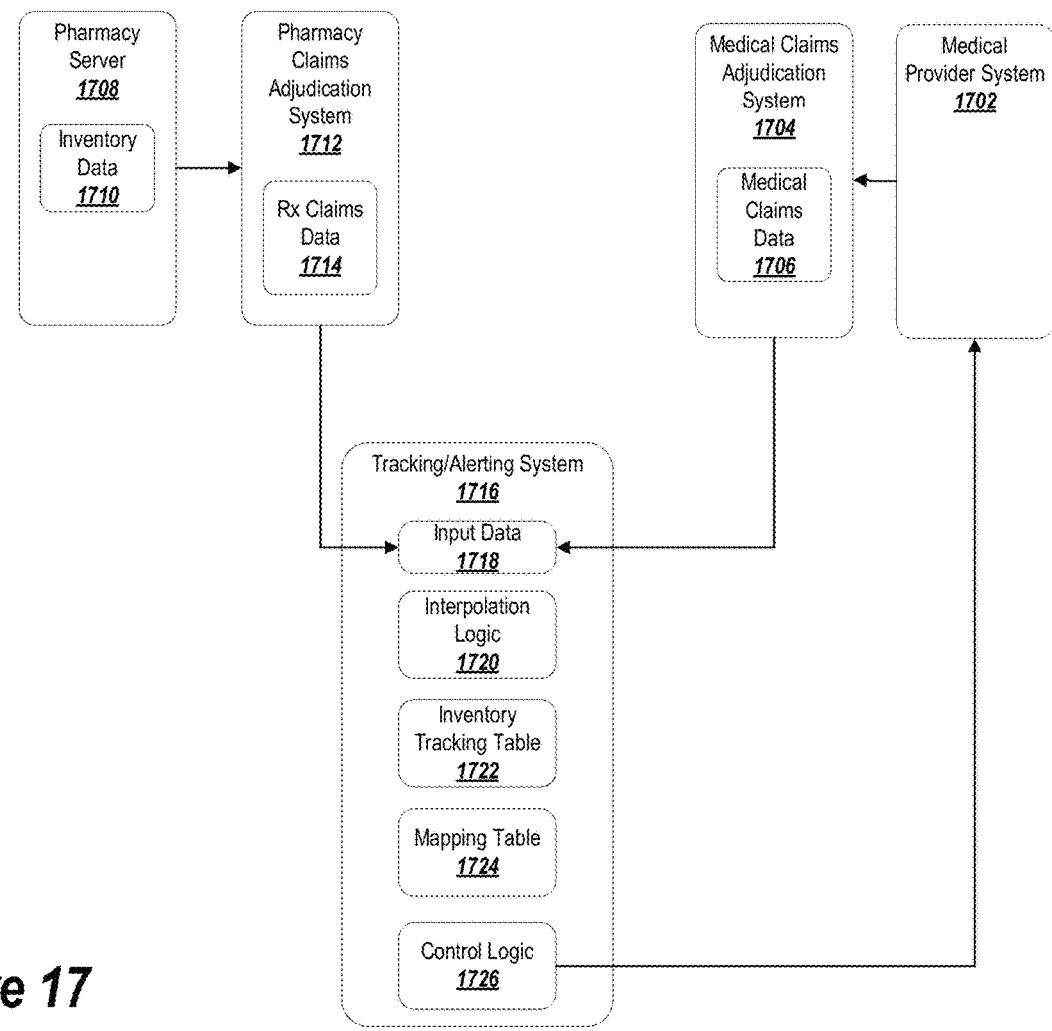
FIG. 17 depicts an exemplary environment suitable for use with exemplary embodiments.

Turning to FIG. 17, a block diagram is presented representing an environment suitable for practicing exemplary embodiments.

A medical provider system 1702 may be associated with a medical provider, such as a person's primary care physician (PCP). The PCP may diagnose a chronic condition, which may be reflected in one or more codes stored in medical claims data 1706 at a medical claims adjudication system 1704 (e.g., maintained by a health insurance company).

The PCP may also write the person a prescription, which the person may fill at a nearby pharmacy. The pharmacy may be associated with a pharmacy server 1708, which maintains inventory data 1710 reflecting the amount of each type of treatment available in the pharmacy. Upon filling a prescription, the pharmacy server 1708 may send information related to the prescription (e.g., the date of the fill, the amount of the fill, etc.) to a pharmacy claims adjudication system 1712, which maintains prescription claims data 1714. The prescription claims data 1714 may identify the person for whom the prescription was filled, the amount and date of fulfillment, and an identify of the type of medication that was given to the person.

The prescription claims data 1714 and the medical claims data 1706 may be provided as input data 1718 to a tracking and alerting system 1716. The tracking and alerting system 1716 may apply interpolation logic 1720 to interpolate information (such as the amount of medication the person has on-hand on a daily basis, and any chronic conditions that the person is deemed likely to have) from the prescription claims data 1714 and the medical claims data 1706. The interpolated information may be stored in the inventory tracking data structure 1722.

The tracking and alerting system 1716 may also apply a mapping data structure 1724 that links chronic conditions to different treatment classes, and treatment classes to individual prescribable medications. The tracking and alerting system 1716 may then apply control logic 1726 to determine adherence to a class of treatments. If adherence falls below a predefined threshold, the control logic 1726 may cause a warning to be sent to the medical provider system 1702.

Note that the present solution need not be used solely to provide alerts to the medical provider system 1702. Alerts may be presented to the patient in order to encourage better adherence. Moreover, information from the inventory tracking data structure 1722 may be sent to the pharmacy server 1708, so that the pharmacy server 1708 can better interpret its own inventory data 1710, and may be used to perform inventory control. For example, diabetic test strips are expensive, and may be stolen by bad actors and fenced for a profit. If the inventory tracking data structure 1722 indicates that the inventory data 1710 should reflect a certain amount of product, such as diabetic test strips, but the inventory data 1710 reflects less of that product than expected, the server 1708 may generate an alert signifying the possibility that the product is being stolen or diverted.

Other entities who may benefit from the embodiments described herein include: health insurance companies (such as Medicare/Medicaid), healthcare providers, health information exchanges, health care systems, patient care monitoring companies, pharmacy benefit managers, pharmacies, public health agencies, and research organizations.

According to some exemplary embodiments, the tracking and alerting system 1716 may perform a method for determining adherence to a treatment schedule.

The exemplary method may involve receiving one or more input signals. The input signals may include medical claims data and pharmacy claims data for a patient.

The method may further involve performing an interpolation process on the input signals. The interpolation process may include: (a) deriving chronic conditions associated with the patient from the medical claims data, (b) mapping the chronic conditions to therapeutic classes of drugs based on a mapping data structure, and (c) mapping the therapeutic classes to prescribed drugs based on the pharmacy claims data.

The mapping data structure may be a predefined mapping data structure that maps chronic conditions to therapeutic classes. Alternatively or in addition, the mapping data structure may be a dynamically-defined custom mapping data structure configured to be updated by adding a therapeutic class to a chronic condition, or by associating a new chronic condition with a therapeutic class.

Optionally, the interpolation process may involve building a medical claims data structure based on the medical claims data. The medical claims data structure may include a plurality of records associated with medical claims, and each record may be associated with a flag indicating whether the respective record was incurred as part of a facility stay.

The method may further involve generating an inventory tracking data structure based on the interpolation process. The inventory tracking data structure may include records that specify: a patient identifier, a chronic condition identifier, a therapeutic class, a drug identifier, a date on which a prescription for a drug corresponding to the drug identifier was filled, a number of days supply dispensed for the prescription, and an amount of supply on-hand.

The method may further involve accessing a controls set, where the controls set includes a list of one or more conditions pertaining to at least one category in the inventory tracking data structure, and an action to be taken when the one or more conditions are met. For example, the conditions may cause a prescribed medication to become expired after a specified amount of time.

The method may further involve, for each chronic condition derived in the interpolation process, calculating a medication adherence value from the inventory tracking data structure. By calculating the amount of on-hand medication at the relatively high level of granularity, the inventory tracking data structure may be configured to calculate medication adherence values in real-time on an arbitrary date. The medication adherence value may be calculated across multiple medications corresponding to a given chronic condition, the multiple medications mapped to a treatment class for the chronic condition in a mapping data structure.

The method may further involve determining that at least one of the medication adherence values is below a predetermined threshold value. Determining that at least one of the medication adherence values for a given adherence date may involve accounting for the facility stay information by refraining from reducing the current number of days supply as of the adherence date if the adherence date corresponds to a day that the patient was undergoing a facility stay.

The method may further involve generating one or more warning signals in response to the at least one medication adherence value being below the predetermined threshold value. The warning may be generated based on the conditions, and may specify an entity to receive the warning and a value of a payload to be provided to the entity in the warning.

The method may further involve transmitting the one or more warning signals to a healthcare provider associated with the patient.

Although exemplary embodiments are described in relation to a problem of monitoring adherence, the present solution is not so limited. The exemplary technology may be used to monitor for status changes and make predictions in connection with any system that maintains a limited inventory of an asset. For example, exemplary embodiments may be useful for monitoring inventory in vehicles such as rental cars, bike shares, ride shares, etc.; brokered marketplaces such as dating websites; etc.

Exemplary embodiments may also be useful for making predictions based on the observed and interpolated inventory trends. For instance, based on interpolated network bandwidth (as described above), a communications system may predict that a particular network link is in danger of becoming saturated, and may shift network traffic to a different link. In another example, a cloud computing server may predict that a server cluster is about to become saturated based on trends in processor utilization, and may provision a new server in order to handle a predicted spike in requests. In another example, a computing system may determine that memory usage is exceeding a predetermined threshold in time periods between observations of the available memory, and may move to proactively remove or clean up unused processes to improve memory availability.

The preceding description provides example embodiments only, and is not intended to limit the scope, applicability, or configuration of the disclosure. Rather, the description of the example embodiments provides those skilled in the art with an enabling description for implementing an example embodiment. It should be understood that various changes may be made in the function and arrangement of elements without departing from the spirit and scope of the technology as set forth in the appended claims.

Specific details are given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

The invention claimed is:

1. A non-transitory computer-readable medium storing instructions that, when executed by one or more processors, cause the one or more processors to compute adherence to a medication for managing a chronic condition, the instructions comprising instructions for:
receiving one or more input signals, the one or more input signals comprising medical claims data and pharmacy claims data for a patient associated with a first data item stored in the database, the first data item associated with a first value;
performing an interpolation process on the input signals, the interpolation process comprising:
deriving one or more chronic conditions associated with the patient from the medical claims data,
mapping the chronic conditions to therapeutic classes of drugs based on a mapping table, and
mapping the therapeutic classes of drugs to prescribed drugs in the database based on the pharmacy claims data, wherein the set of data items includes the first data item and a second data item;
generating a inventory tracking table based on the interpolation process, the inventory tracking table comprising: a patient identifier, a chronic condition identifier, a therapeutic class of data items, a drug identifier, a date on which a prescription for a drug corresponding to the drug identifier was filled, a number of days supply dispensed for the prescription, an amount of supply on-hand, an adherence date under consideration, a current number of days supply as of the adherence date, and a flag indicating if the patient was undergoing a facility stay for each day a patient is being examined for adherence;
for each condition derived in the interpolation process, computing an adherence value from the inventory tracking table based on the values of the first data item and the second data item;
determining that at least one of the adherence values is below a predetermined threshold value;
generating one or more warning signals in response to the at least one adherence value being below the predetermined threshold value; and
transmitting the one or more warning signals to a server associated with the patient from the medical claims data or with a healthcare provider associated with the patient.

2. The medium of claim 1, wherein the interpolation process comprises deriving facility stay information from the medical claims.

3. The medium of claim 2, wherein determining the at least one medication adherence values comprises accounting for the facility stay information by refraining from reducing the current number of days supply as of the adherence date if the adherence date corresponds to a day that the patient was undergoing a facility stay.

4. The medium of claim 1, wherein the mapping table is a predefined mapping table that maps chronic conditions to therapeutic classes, or the mapping table is a dynamically-defined custom mapping table.

5. The medium of claim 1, wherein the one or more conditions cause a warning to be generated only for a specified type of chronic condition, or cause a prescribed medication to become expired after a specified amount of time.

6. The medium of claim 1, wherein the inventory tracking table is configured to calculate medication adherence values in real-time on an arbitrary date.

7. The medium of claim 1, wherein the medication adherence value is calculated across multiple medications corresponding to a given chronic condition.

8. The medium of claim 1, further storing instructions for accessing a controls set describing one or more conditions pertaining to at least one category in the inventory tracking table, and an action to be taken when the one or more conditions are met.

9. The medium of claim 1, wherein the interpolation process comprises:
identifying one or more actions associated with the one or more input signals, and identifying a rate at which a value of the data item is expected to change in view of the one or more actions;
wherein the tracking data structure stores an amount of inventory that is calculated, at least in part, based on the identified rate.

10. A computer-implemented method for computing adherence to a medication for managing a chronic condition, the method comprising:
receiving one or more input signals, the one or more input signals comprising medical claims data and pharmacy claims data for a patient associated with a first data item stored in the database, the first data item associated with a first value;
performing an interpolation process on the input signals, the interpolation process comprising:
deriving one or more chronic conditions associated with the patient from the medical claims data,
mapping the chronic conditions to therapeutic classes of drugs based on a mapping table, and
mapping the therapeutic classes of drugs to prescribed drugs in the database based on the pharmacy claims data, wherein the set of data items includes the first data item and a second data item;
generating a inventory tracking table based on the interpolation process, the inventory tracking table comprising: a patient identifier, a chronic condition identifier, a therapeutic class of data items, a drug identifier, a date on which a prescription for a drug corresponding to the drug identifier was filled, a number of days supply dispensed for the prescription, an amount of supply on-hand, an adherence date under consideration, a current number of days supply as of the adherence date, and a flag indicating if the patient was undergoing a facility stay for each day a patient is being examined for adherence;
for each condition derived in the interpolation process, computing an adherence value from the inventory tracking table based on the values of the first data item and the second data item;
determining that at least one of the adherence values is below a predetermined threshold value;
generating one or more warning signals in response to the at least one adherence value being below the predetermined threshold value; and
transmitting the one or more warning signals to a server associated with the patient from the medical claims data or with a healthcare provider associated with the patient.

11. The method of claim 10, wherein the interpolation process comprises deriving facility stay information from the medical claims.

12. The method of claim 11, wherein determining the at least one medication adherence values comprises accounting for the facility stay information by refraining from reducing the current number of days supply as of the adherence date if the adherence date corresponds to a day that the patient was undergoing a facility stay.

13. The method of claim 10, wherein the mapping table is a predefined mapping table that maps chronic conditions to therapeutic classes, or the mapping table is a dynamically-defined custom mapping table.

14. The method of claim 10, wherein the one or more conditions cause a warning to be generated only for a specified type of chronic condition, or cause a prescribed medication to become expired after a specified amount of time.

15. The method of claim 10, wherein the inventory tracking table is configured to calculate medication adherence values in real-time on an arbitrary date.

16. The method of claim 10, wherein the medication adherence value is calculated across multiple medications corresponding to a given chronic condition.

17. The method of claim 10, further comprising accessing a controls set describing one or more conditions pertaining to at least one category in the inventory tracking table, and an action to be taken when the one or more conditions are met.

18. The method of claim 10, wherein the interpolation process comprises:
 identifying one or more actions associated with the one or more input signals, and
 identifying a rate at which a value of the data item is expected to change in view of the one or more actions;
 wherein the tracking data structure stores an amount of inventory that is calculated, at least in part, based on the identified rate.

19. An apparatus configured to compute adherence to a medication for managing a chronic condition, the apparatus comprising:
 a hardware interface configured to receive one or more input signals, the one or more input signals comprising medical claims data and pharmacy claims data for a patient associated with a first data item stored in the database, the first data item associated with a first value; and
 a hardware processor circuit configured to:
 perform an interpolation process on the input signals, the interpolation process comprising:
  deriving one or more chronic conditions associated with the patient from the medical claims data,
  mapping the chronic conditions to therapeutic classes of drugs based on a mapping table, and
  mapping the therapeutic classes of drugs to prescribed drugs in the database based on the pharmacy claims data, wherein the set of data items includes the first data item and a second data item;
 generating a inventory tracking table based on the interpolation process, the inventory tracking table comprising: a patient identifier, a chronic condition identifier, a therapeutic class of data items, a drug identifier, a date on which a prescription for a drug corresponding to the drug identifier was filled, a number of days supply dispensed for the prescription, an amount of supply on-hand, an adherence date under consideration, a current number of days supply as of the adherence date, and a flag indicating if the patient was undergoing a facility stay for each day a patient is being examined for adherence;
 for each condition derived in the interpolation process, compute an adherence value from the inventory tracking table based on the values of the first data item and the second data item;
 determine that at least one of the adherence values is below a predetermined threshold value;
 generate one or more warning signals in response to the at least one adherence value being below the predetermined threshold value; and
 transmit the one or more warning signals to a server associated with the patient from the medical claims data or with a healthcare provider associated with the patient.

20. The apparatus of claim 10, wherein the interpolation process comprises deriving facility stay information from the medical claims.

21. The apparatus of claim 20, wherein determining the at least one medication adherence values comprises accounting for the facility stay information by refraining from reducing the current number of days supply as of the adherence date if the adherence date corresponds to a day that the patient was undergoing a facility stay.

22. The apparatus of claim 10, wherein the mapping table is a predefined mapping table that maps chronic conditions to therapeutic classes, or the mapping table is a dynamically-defined custom mapping table.

23. The apparatus of claim 10, wherein the one or more conditions cause a warning to be generated only for a specified type of chronic condition, or cause a prescribed medication to become expired after a specified amount of time.

24. The apparatus of claim 10, wherein the inventory tracking table is configured to calculate medication adherence values in real-time on an arbitrary date.

25. The apparatus of claim 10, wherein the medication adherence value is calculated across multiple medications corresponding to a given chronic condition.

26. The apparatus of claim 19, wherein the hardware processor circuit is further configured to access a controls set describing one or more conditions pertaining to at least one category in the inventory tracking table, and an action to be taken when the one or more conditions are met.

27. The apparatus of claim 19, wherein the interpolation process comprises:
 identifying one or more actions associated with the one or more input signals, and
 identifying a rate at which a value of the data item is expected to change in view of the one or more actions;
 wherein the tracking data structure stores an amount of inventory that is calculated, at least in part, based on the identified rate.

* * * * *